(12) United States Patent
Sterental et al.

(10) Patent No.: US 11,484,389 B2
(45) Date of Patent: Nov. 1, 2022

(54) SYSTEMS, METHODS, AND APPARATUS FOR CORRECTING MALOCCLUSIONS OF TEETH

(71) Applicant: ALIGN TECHNOLOGY, INC., San Jose, CA (US)

(72) Inventors: Rene M. Sterental, Palo Alto, CA (US); Samuel Blanco, Santa Clara, CA (US); Anton Lapshin, Nizhny Novgorod (RU); Alexander Kulinich, Village Okskij (RU); Valery Prokoshev, Vladimir (RU); Boris Vasilevskiy, Ufa (RU); Evgeniy Morozov, Uluanovsk (RU); Jason Ramos, San Jose (CR)

(73) Assignee: Align Technology, Inc., San Jose, CA (US)

( * ) Notice: Subject to any disclaimer, the term of this patent is extended or adjusted under 35 U.S.C. 154(b) by 470 days.

(21) Appl. No.: 16/103,763

(22) Filed: Aug. 14, 2018

(65) Prior Publication Data
US 2019/0053876 A1 Feb. 21, 2019

Related U.S. Application Data

(60) Provisional application No. 62/547,004, filed on Aug. 17, 2017.

(51) Int. Cl.
*A61C 7/08* (2006.01)
*A61C 7/00* (2006.01)
(Continued)

(52) U.S. Cl.
CPC ............... *A61C 7/002* (2013.01); *A61C 7/08* (2013.01); *B29C 64/386* (2017.08); *B33Y 50/00* (2014.12); *G06V 2201/12* (2022.01)

(58) Field of Classification Search
CPC ......... B29C 64/386; B33Y 50/00; A61C 7/08; A61C 7/002; G06K 2209/40; G06V 2201/12
See application file for complete search history.

(56) References Cited

U.S. PATENT DOCUMENTS

| | | | |
|---|---|---|---|
| 2,467,432 | A | 4/1949 | Kesling |
| 3,407,500 | A | 10/1968 | Kesling |

(Continued)

FOREIGN PATENT DOCUMENTS

| | | | |
|---|---|---|---|
| AU | 3031677 | A | 5/1979 |
| AU | 517102 | B2 | 7/1981 |

(Continued)

OTHER PUBLICATIONS

AADR. American Association for Dental Research, Summary of Activities, Mar. 20-23, 1980, Los Angeles, CA, p. 195.

(Continued)

*Primary Examiner* — Syed Haider
(74) *Attorney, Agent, or Firm* — Wilson Sonsini Goodrich & Rosati

(57) ABSTRACT

Methods and systems are provided for manufacturing an appliance for correcting malocclusions of a patient's teeth. The method may include measuring the positions of a patient's teeth and receiving tooth movement constraints. The method may also include generating an initial treatment plan based on the measured tooth positions and the tooth movement constraints and measuring the malocclusions of the patient's teeth for one or more types of dental malocclusions. The method may also include generating a plurality of treatment plans from the initial treatment plan based on the measured malocclusion and generating a model of an appliance for each stage of the treatment plan. The method may also include generating instructions for fabricating the (Continued)

appliance for each stage of the treatment plan based on the model of the appliance for each stage of the treatment plan.

22 Claims, 15 Drawing Sheets

(51) Int. Cl.
  *B33Y 50/00* (2015.01)
  *B29C 64/386* (2017.01)

(56) References Cited

U.S. PATENT DOCUMENTS

| | | |
|---|---|---|
| 3,600,808 A | 8/1971 | Reeve |
| 3,660,900 A | 5/1972 | Andrews |
| 3,683,502 A | 8/1972 | Wallshein |
| 3,738,005 A | 6/1973 | Cohen et al. |
| 3,860,803 A | 1/1975 | Levine |
| 3,916,526 A | 11/1975 | Schudy |
| 3,922,786 A | 12/1975 | Lavin |
| 3,950,851 A | 4/1976 | Bergersen |
| 3,983,628 A | 10/1976 | Acevedo |
| 4,014,096 A | 3/1977 | Dellinger |
| 4,195,046 A | 3/1980 | Kesling |
| 4,253,828 A | 3/1981 | Coles et al. |
| 4,324,546 A | 4/1982 | Heitlinger et al. |
| 4,324,547 A | 4/1982 | Arcan et al. |
| 4,348,178 A | 9/1982 | Kurz |
| 4,478,580 A | 10/1984 | Barrut |
| 4,500,294 A | 2/1985 | Lewis |
| 4,504,225 A | 3/1985 | Yoshii |
| 4,505,673 A | 3/1985 | Yoshii |
| 4,526,540 A | 7/1985 | Dellinger |
| 4,575,330 A | 3/1986 | Hull |
| 4,575,805 A | 3/1986 | Moermann et al. |
| 4,591,341 A | 5/1986 | Andrews |
| 4,609,349 A | 9/1986 | Cain |
| 4,611,288 A | 9/1986 | Duret et al. |
| 4,656,860 A | 4/1987 | Orthuber et al. |
| 4,663,720 A | 5/1987 | Duret et al. |
| 4,664,626 A | 5/1987 | Kesling |
| 4,676,747 A | 6/1987 | Kesling |
| 4,742,464 A | 5/1988 | Duret et al. |
| 4,755,139 A | 7/1988 | Abbatte et al. |
| 4,763,791 A | 8/1988 | Halverson et al. |
| 4,793,803 A | 12/1988 | Martz |
| 4,798,534 A | 1/1989 | Breads |
| 4,836,778 A | 6/1989 | Baumrind et al. |
| 4,837,732 A | 6/1989 | Brandestini et al. |
| 4,850,864 A | 7/1989 | Diamond |
| 4,850,865 A | 7/1989 | Napolitano |
| 4,856,991 A | 8/1989 | Breads et al. |
| 4,877,398 A | 10/1989 | Kesling |
| 4,880,380 A | 11/1989 | Martz |
| 4,889,238 A | 12/1989 | Batchelor |
| 4,890,608 A | 1/1990 | Steer |
| 4,935,635 A | 6/1990 | O'Harra |
| 4,936,862 A | 6/1990 | Walker et al. |
| 4,937,928 A | 7/1990 | Van Der Zel |
| 4,941,826 A | 7/1990 | Loran et al. |
| 4,964,770 A | 10/1990 | Steinbichler et al. |
| 4,975,052 A | 12/1990 | Spencer et al. |
| 4,983,334 A | 1/1991 | Adell |
| 5,011,405 A | 4/1991 | Lemchen |
| 5,017,133 A | 5/1991 | Miura |
| 5,027,281 A | 6/1991 | Rekow et al. |
| 5,035,613 A | 7/1991 | Breads et al. |
| 5,055,039 A | 10/1991 | Abbatte et al. |
| 5,059,118 A | 10/1991 | Breads et al. |
| 5,100,316 A | 3/1992 | Wildman |
| 5,121,333 A | 6/1992 | Riley et al. |
| 5,125,832 A | 6/1992 | Kesling |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,184,306 A | 2/1993 | Erdman et al. |
| 5,186,623 A | 2/1993 | Breads et al. |
| 5,257,203 A | 10/1993 | Riley et al. |
| 5,273,429 A | 12/1993 | Rekow et al. |
| 5,278,756 A | 1/1994 | Lemchen et al. |
| 5,328,362 A | 7/1994 | Watson et al. |
| 5,338,198 A | 8/1994 | Wu et al. |
| 5,340,309 A | 8/1994 | Robertson |
| 5,342,202 A | 8/1994 | Deshayes |
| 5,368,478 A | 11/1994 | Andreiko et al. |
| 5,382,164 A | 1/1995 | Stern |
| 5,395,238 A | 3/1995 | Andreiko et al. |
| 5,431,562 A | 7/1995 | Andreiko et al. |
| 5,440,326 A | 8/1995 | Quinn |
| 5,440,496 A | 8/1995 | Andersson et al. |
| 5,447,432 A | 9/1995 | Andreiko et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| RE35,169 E | 3/1996 | Lemchen et al. |
| 5,518,397 A | 5/1996 | Andreiko et al. |
| 5,528,735 A | 6/1996 | Strasnick et al. |
| 5,533,895 A | 7/1996 | Andreiko et al. |
| 5,542,842 A | 8/1996 | Andreiko et al. |
| 5,549,476 A | 8/1996 | Stern |
| 5,562,448 A | 10/1996 | Mushabac |
| 5,587,912 A | 12/1996 | Andersson et al. |
| 5,605,459 A | 2/1997 | Kuroda et al. |
| 5,607,305 A | 3/1997 | Andersson et al. |
| 5,614,075 A | 3/1997 | Andre, Sr. |
| 5,621,648 A | 4/1997 | Crump |
| 5,645,420 A | 7/1997 | Bergersen |
| 5,645,421 A | 7/1997 | Slootsky |
| 5,655,653 A | 8/1997 | Chester |
| 5,683,243 A | 11/1997 | Andreiko et al. |
| 5,692,894 A | 12/1997 | Schwartz et al. |
| 5,725,376 A | 3/1998 | Poirier |
| 5,725,378 A | 3/1998 | Wang |
| 5,733,126 A | 3/1998 | Andersson et al. |
| 5,740,267 A | 4/1998 | Echerer et al. |
| 5,742,700 A | 4/1998 | Yoon et al. |
| 5,799,100 A | 8/1998 | Clarke et al. |
| 5,800,174 A | 9/1998 | Andersson |
| 5,823,778 A | 10/1998 | Schmitt et al. |
| 5,848,115 A | 12/1998 | Little et al. |
| 5,857,853 A | 1/1999 | Van Nifterick et al. |
| 5,866,058 A | 2/1999 | Batchelder et al. |
| 5,879,158 A | 3/1999 | Doyle et al. |
| 5,880,961 A | 3/1999 | Crump |
| 5,880,962 A | 3/1999 | Andersson et al. |
| 5,934,288 A | 8/1999 | Avila et al. |
| 5,957,686 A | 9/1999 | Anthony |
| 5,964,587 A | 10/1999 | Sato |
| 5,971,754 A | 10/1999 | Sondhi et al. |
| 5,975,893 A | 11/1999 | Chishti et al. |
| 6,015,289 A | 1/2000 | Andreiko et al. |
| 6,044,309 A | 3/2000 | Honda |
| 6,049,743 A | 4/2000 | Baba |
| 6,062,861 A | 5/2000 | Andersson |
| 6,068,482 A | 5/2000 | Snow |
| 6,099,314 A | 8/2000 | Kopelman et al. |
| 6,123,544 A | 9/2000 | Cleary |
| 6,152,731 A | 11/2000 | Jordan et al. |
| 6,183,248 B1 | 2/2001 | Chishti et al. |
| 6,190,165 B1 | 2/2001 | Andreiko et al. |
| 6,217,325 B1 | 4/2001 | Chishti et al. |
| 6,217,334 B1 | 4/2001 | Hultgren et al. |
| 6,244,861 B1 | 6/2001 | Andreiko et al. |
| 6,309,215 B1 | 10/2001 | Phan et al. |
| 6,315,553 B1 | 11/2001 | Sachdeva et al. |
| 6,322,359 B1 | 11/2001 | Jordan et al. |
| 6,350,120 B1 | 2/2002 | Sachdeva et al. |
| 6,382,975 B1 | 5/2002 | Poirier |
| 6,398,548 B1 | 6/2002 | Muhammad et al. |

(56) References Cited

U.S. PATENT DOCUMENTS

| | | | |
|---|---|---|---|
| 6,402,707 | B1 | 6/2002 | Ernst |
| 6,450,807 | B1 | 9/2002 | Chishti et al. |
| 6,482,298 | B1 | 11/2002 | Bhatnagar |
| 6,524,101 | B1 | 2/2003 | Phan et al. |
| 6,554,611 | B2 | 4/2003 | Shishti et al. |
| 6,572,372 | B1 | 6/2003 | Phan et al. |
| 6,629,840 | B2 | 10/2003 | Chishti et al. |
| 6,705,863 | B2 | 3/2004 | Phan et al. |
| 6,722,880 | B2 | 4/2004 | Chishti et al. |
| 6,749,414 | B1 | 6/2004 | Hanson et al. |
| 6,830,450 | B2 | 12/2004 | Knopp et al. |
| 7,892,474 | B2 | 2/2011 | Shkolnik et al. |
| 2002/0006597 | A1 | 1/2002 | Andreiko et al. |
| 2002/0042038 | A1 | 4/2002 | Miller et al. |
| 2003/0009252 | A1 | 1/2003 | Pavlovskaia et al. |
| 2003/0139834 | A1 | 7/2003 | Nikolskiy et al. |
| 2003/0224311 | A1 | 12/2003 | Cronauer |
| 2004/0128010 | A1 | 7/2004 | Pavlovskaia et al. |
| 2005/0055118 | A1 | 3/2005 | Nikolskiy et al. |
| 2005/0192835 | A1* | 9/2005 | Kuo .................. B33Y 50/00 705/2 |
| 2005/0271996 | A1* | 12/2005 | Sporbert ............. A61C 7/00 433/24 |
| 2007/0129991 | A1* | 6/2007 | Kuo .................. G16H 50/70 705/2 |
| 2007/0168152 | A1* | 7/2007 | Matov ............... B33Y 80/00 702/155 |
| 2014/0061974 | A1 | 3/2014 | Tyler et al. |
| 2014/0265034 | A1 | 9/2014 | Dudley et al. |
| 2015/0097315 | A1 | 4/2015 | Desimone et al. |
| 2015/0097316 | A1 | 4/2015 | Desimone et al. |
| 2015/0102532 | A1 | 4/2015 | Desimone et al. |
| 2015/0190212 | A1 | 7/2015 | Kitching et al. |
| 2017/0100214 | A1* | 4/2017 | Wen .................. G16H 30/20 |
| 2017/0105815 | A1 | 4/2017 | Matov et al. |
| 2017/0224442 | A1 | 8/2017 | Kuo |
| 2018/0303583 | A1* | 10/2018 | Tong ................. A61C 7/146 |

FOREIGN PATENT DOCUMENTS

| | | |
|---|---|---|
| AU | 5598894 A | 6/1994 |
| CA | 1121955 A | 4/1982 |
| CN | 101616637 A | 12/2009 |
| CN | 102933171 A | 2/2013 |
| DE | 2749802 A1 | 5/1978 |
| DE | 69327661 T2 | 7/2000 |
| EP | 0091876 A1 | 10/1983 |
| EP | 0299490 A2 | 1/1989 |
| EP | 0376873 A2 | 7/1990 |
| EP | 0490848 A2 | 6/1992 |
| EP | 0541500 A1 | 5/1993 |
| EP | 0667753 B1 | 1/2000 |
| EP | 0774933 B1 | 12/2000 |
| EP | 0731673 B1 | 5/2001 |
| ES | 463897 A1 | 1/1980 |
| FR | 2369828 A1 | 6/1978 |
| FR | 2652256 A1 | 3/1991 |
| GB | 1550777 A | 8/1979 |
| JP | S5358191 A | 5/1978 |
| JP | H0428359 A | 1/1992 |
| JP | H06277240 A | 10/1994 |
| JP | H08508174 A | 9/1996 |
| WO | WO-9008512 A1 | 8/1990 |
| WO | WO-9104713 A1 | 4/1991 |
| WO | WO-9410935 A1 | 5/1994 |
| WO | WO-9832394 A1 | 7/1998 |
| WO | WO-9844865 A1 | 10/1998 |
| WO | WO-9858596 A1 | 12/1998 |
| WO | WO-2019036514 A1 | 2/2019 |

OTHER PUBLICATIONS

Alcaniz, et aL, "An Advanced System for the Simulation and Planning of Orthodontic Treatments," Karl Heinz Hohne and Ron Kikinis (eds.), Visualization in Biomedical Computing, 4th Intl. Conf., VBC '96, Hamburg, Germany, September22-25, 1996, Springer-Verlag, pp. 511-520.

Alexander et al., "The DigiGraph Work Station Part 2 Clinical Management," JCO, pp. 402-407 (Jul. 1990).

Altschuler, "3D Mapping of Maxillo-Facial Prosthesis," AADR Abstract #607, 2 pages total, (1980).

Altschuler et al., "Analysis of 3-D Data for Comparative 3-D Serial Growth Pattern Studies of Oral-Facial Structures," IADR Abstracts, Program and Abstracts of Papers, 57th General Session, IADR Annual Session, Mar. 29, 1979-Apr. 1, 1979, New Orleans Marriot, Journal of Dental Research, vol. 58, Jan. 1979, Special Issue A, p. 221.

Altschuler et al., "Laser Electro-Optic System for Rapid Three-Dimensional (3D) Topographic Mapping of Surfaces," Optical Engineering, 20(6):953-961 (1981).

Altschuler et al., "Measuring Surfaces Space-Coded by a Laser-Projected Dot Matrix," SPIE Imaging Applications for Automated Industrial Inspection and Assembly, vol. 182, p. 187-191 (1979).

Andersson et al., "Clinical Results with Titanium Crowns Fabricated with Machine Duplication and Spark Erosion," Acta. Odontol. Scand., 47:279-286 (1989).

Andrews, The Six Keys to Optimal Occlusion Straight Wire, Chapter 3, pp. 13-24 (1989).

Bartels, et al., An Introduction to Splines for Use in Computer Graphics and Geometric Modeling, Morgan Kaufmann Publishers, pp. 422-425 (1987).

Baumrind, "A System for Craniofacial Mapping Through the Integration of Data from Stereo X-Ray Films and Stereo Photographs," an invited paper submitted to the 1975 American Society of Photogram Symposium on Close-Range Photogram Systems, University of Ill., Aug. 26-30, 1975, pp. 142-166.

Baumrind et al., "A Stereophotogrammetric System for the Detection of Prosthesis Loosening in Total Hip Arthroplasty, NATO Symposium on Applications of Human Biostereometrics," Jul. 9-13, 1978, SPIE, vol. 166, pp. 112-123.

Baumrind et al., "Mapping the Skull in 3-D," reprinted from J. Calif. Dent. Assoc., 48(2), 11 pages total, (1972 Fall Issue).

Baumrind, "Integrated Three-Dimensional Craniofacial Mapping: Background, Principles, and Perspectives," Semin. in Orthod., 7(4):223-232 (Dec. 2001).

Begole et al., "A Computer System for the Analysis of Dental Casts," The Angle Orthod., 51(3):253-259 (Jul. 1981).

Bernard et al.,"Computerized Diagnosis in Orthodontics for Epidemiological Studies: A Progress Report," Abstract, J. Dental Res. Special Issue, vol. 67, p. 169, paper presented at International Association for Dental Research 66th General Session, Mar. 9-13, 1988, Montreal, Canada.

Bhatia et al., "A Computer-Aided Design for Orthognathic Surgery," Br. J. Oral Maxillofac. Surg., 22:237-253 (1984).

Biggerstaff, "Computerized Diagnostic Setups and Simulations," Angle Orthod., 40(1):28-36 (Jan. 1970).

Biggerstaff et al., "Computerized Analysis of Occlusion in the Postcanine Dentition," Am. J. Orthod., 61(3): 245-254 (Mar. 1972).

Biostar Opeation & Training Manual. Great Lakes Orthodontics, Ltd. 199 Fire Tower Drive, Tonawanda, New York. 14150-5890, 20 pages total (1990).

Blu, et al., "Linear interpolation revitalized", IEEE Trans. Image Proc., 13(5):710-719 (May 2004).

Bourke, "Coordinate System Transformation," (Jun. 1996), p. 1, retrieved from the Internet Nov. 5, 2004, URL< http://astronomy.swin.edu.au/—pbourke/prolection/coords>.

Boyd et al., "Three Dimensional Diagnosis and Orthodontic Treatment of Complex Malocclusions With the Invisalipn Appliance," Semin. Orthod., 7(4):274-293 (Dec. 2001).

Brandestini et al., "Computer Machined Ceramic Inlays: In Vitro Marginal Adaptation," J. Dent. Res. Special Issue, Abstract 305, vol. 64, p. 208 (1985).

(56) References Cited

OTHER PUBLICATIONS

Brook et al., "An Image Analysis System for the Determination of Tooth Dimensions from Study Casts: Comparison with Manual Measurements of Mesio-distal Diameter," J. Dent. Res., 65(3):428-431 (Mar. 1986).
Burstone et al., Precision Adjustment of the Transpalatal Lingual Arch: Computer Arch Form IN Predetermination, Am, Journal of Orthodontics, vol. 79, No. 2 (Feb. 1981), pp. 115-133.
Burstone (interview), "Dr. Charles J. Burstone on The Uses of the Computer in Orthodontic Practice (Part 1)," J. Clin. Orthod., 13(7):442-453 (Jul. 1979).
Burstone (interview), "Dr. Charles J. Burstone on The Uses of the Computer in Orthodontic Practice (Part 2)," J. Clin. Orthod., 13(8):539-551 (Aug. 1979).
Cardinal Industrial Finishes, Powder Coatings information posted at< http://www.cardinalpaint.com> on Aug. 25, 2000, 2 pages.
Carnaghan, "An Alternative to Holograms for the Portrayal of Human Teeth," 4th Int'l. Conf. on Holographic Systems, Components and Applications, Sep. 15, 1993, pp. 228-231.
Chaconas et al., "The DigiGraph Work Station, Part 1, Basic Concepts," JCO, pp. 360-367 (Jun. 1990).
Chafetz et al., "Subsidence of the Femoral Prosthesis, A Stereophotogrammetric Evaluation," Clin. Orthop. Relat. Res., No. 201, pp. 60-67 (Dec. 1985).
Chiappone, (1980). Constructing the Gnathologic Setup and Positioner, J. Clin. Orthod, vol. 14, pp. 121-133.
Cottingham, (1969). Gnathologic Clear Plastic Positioner, Am. J. Orthod, vol. 55, pp. 23-31.
Crawford, "CAD/CAM in the Dental Office: Does It Work?", Canadian Dental Journal, vol. 57, No. 2, pp. 121-123 (Feb. 1991).
Crawford, "Computers in Dentistry: Part 1 CAD/CAM: The Computer Moves Chairside," Part 2 F. Duret—A Man with a Vision,"Part 3 The Computer Gives New Vision—Literally, Part 4 Bytes 'N Bites—The Computer Moves from the Front Desk to the Operatory," Canadian Dental Journal, vol. 54 (9), pp. 661-666 (1988).
Crooks, "CAD/CAM Comes to USC," USC Dentistry, pp. 14-17 (Spring 1990).
Cureton, Correcting Malaligned Mandibular Incisors with Removable Retainers, J. Clin. Orthod, vol. 30, No. 7 (1996) pp. 390-395.
Curry et al., "Integrated Three-Dimensional Craniofacial Mapping at the Craniofacial Research Instrumentation Laboratory/University of the Pacific," Semin. Orthod., 7(4):258-265 (Dec. 2001).
Cutting et a/., "Three-Dimensional Computer-Assisted Design of Craniofacial Surgical Procedures: Optimization and Interaction with Cephalometric and CT-Based Models," Plast. 77(6):877-885 (Jun. 1986).
DCS Dental AG, "The CAD/CAM 'DCS Titan System' for Production of Crowns/Bridges," DSC Production AG, pp. 1-7 (Jan. 1992).
Definition for gingiva. Dictionary.com p. 1-3. Retrieved from the internet Nov. 5, 2004< http://reference.com/search/search?q=gingiva>.
Defranco et al., "Three-Dimensional Large Displacement Analysis of Orthodontic Appliances," J. Biomechanics, 9:793-801 (1976).
Dental Institute University of Zurich Switzerland, Program for International Symposium JD on Computer Restorations: State of the Art of the CEREC-Method, May 1991, 2 pages total.
Dentrac Corporation, Dentrac document, pp. 4-13 (1992).
DENT-X posted on Sep. 24, 1998 at< http://www.dent-x.com/DentSim.htm>, 6 pages.
Doyle, "Digital Dentistry," Computer Graphics World, pp. 50-52, 54 (Oct. 2000).
DuraClearTM product information, Allesee Orthodontic Appliances—Pro Lab, 1 page (1997).
Duret et al., "CAD/CAM Imaging in Dentistry," Curr. Opin. Dent., 1:150-154 (1991).
Duret et al., "CAD-CAM in Dentistry," J. Am. Dent. Assoc. 117:715-720 (Nov. 1988).
Duret, "The Dental CAD/CAM, General Description of the Project," Hennson International Product Brochure, 18 pages total, Jan. 1986.
Duret,"Vers Une Prosthese Informatisee," (English translation attached), Tonus, vol. 75, pp. 55-57 (Nov. 15, 1985).
Economides, "The Microcomputer in the Orthodontic Office," JCO, pp. 767-772 (Nov. 1979).
Elsasser, Some Observations on the History and Uses of the Kesling Positioner, Am. J. Orthod. (1950) 36:368-374.
English translation of Japanese Laid-Open Publication No. 63-11148 to inventor T. Ozukuri (Laid-Open on Jan. 18, 1998) pp. 1-7.
Felton et al., "A Computerized Analysis of the Shape and Stability of Mandibular Arch Form," Am. J. Orthod. Dentofacial Orthop., 92(6):478-483 (Dec. 1987).
Friede et al., "Accuracy of Cephalometric Prediction in Orthognathic Surgery," Abstract of Papers, J. Dent. Res., 70:754-760 (1987).
Futterling et a/., "Automated Finite Element Modeling of a Human Mandible with Dental Implants," JS WSCG '98-Conference Program, retrieved from the Internet:<http://wscg.zcu.cz/wscg98/papers98/Strasser 98.pdf>, 8 pages.
Gao et al., "3-D element Generation for Multi-Connected Complex Dental and Mandibular Structure," Proc. Intl Workshop on Medical Imaging and Augmented Reality, pp. 267-271 (Jun. 12, 2001).
Gim-Alldent Deutschland, "Das DUX System: Die Technik," 2 pages total (2002).
Gottleib et al., "JCO Interviews Dr. James A. McNamura, Jr., on the Frankel Appliance: Part 2: Clinical 1-1 Management,"J. Clin. Orthod., 16(6):390-407 (Jun. 1982).
Grayson, "New Methods for Three Dimensional Analysis of Craniofacial Deformity, Symposium: JW Computerized Facial Imaging in Oral and Maxiiofacial Surgery," AAOMS, 3 pages total, (Sep. 13, 1990).
Guess et al., "Computer Treatment Estimates In Orthodontics and Orthognathic Surgery," JCO, pp. 262-228 (Apr. 1989).
Heaven et a/., "Computer-Based Image Analysis of Artificial Root Surface Caries, Abstracts of Papers," J. Dent. Res., 70:528 (Apr. 17-21, 1991).
Highbeam Research, "Simulating Stress Put on Jaw," Tooling & Production [online], Nov. 1996, n pp. 1-2, retrieved from the Internet on Nov. 5, 2004, URL http://static.highbeam.com/t/toolingampproduction/november011996/simulatingstressputonfa . . . >.
Hikage, "Integrated Orthodontic Management System for Virtual Three-Dimensional Computer Graphic Simulation and Optical Video Image Database for Diagnosis and Treatment Planning", Journal of Japan KA Orthodontic Society, Feb. 1987, English translation, pp. 1-38, Japanese version, 46(2), pp. 248-269 (60 pages total).
Hoffmann, et al., "Role of Cephalometry for Planning of Jaw Orthopedics and Jaw Surgery Procedures," (Article Summary in English, article in German), Informatbnen, pp. 375-396 (Mar. 1991).
Hojjatie et al., "Three-Dimensional Finite Element Analysis of Glass-Ceramic Dental Crowns," J. Biomech., 23(11):1157-1166 (1990).
Huckins, "CAD-CAM Generated Mandibular Model Prototype from MRI Data," AAOMS, p. 96 (1999).
Important Tip About Wearing the Red White & Blue Active Clear Retainer System, Allesee Orthodontic Appliances—Pro Lab, 1 page 1998).
International search report with written opinion dated Nov. 2, 2018 for PCT/US2018/046773.
JCO Interviews, Craig Andreiko , DDS, MS on the Elan and Orthos Systems, JCO, pp. 459-468 (Aug. 1994).
JCO Interviews, Dr. Homer W. Phillips on Computers in Orthodontic Practice, Part 2, JCO. 1997; 1983:819-831.
Jerrold, "The Problem, Electronic Data Transmission and the Law," AJO-DO, pp. 478-479 (Apr. 1988).
Jones et al., "An Assessment of the Fit of a Parabolic Curve to Pre- and Post-Treatment Dental Arches," Br. J. Orthod., 16:85-93 (1989).
Jp Faber et al., "Computerized Interactive Orthodontic Treatment Planning," Am. J. Orthod., 73(1):36-46 (Jan. 1978).
Kamada et.al., Case Reports On Tooth Positioners Using LTV Vinyl Silicone Rubber, J. Nihon University School of Dentistry (1984) 26(1): 11-29.
Kamada et.al., Construction of Tooth Positioners with LTV Vinyl Silicone Rubber and Some Case KJ Reports, J. Nihon University School of Dentistry (1982) 24(1):1-27.

(56) References Cited

OTHER PUBLICATIONS

Kanazawa et al., "Three-Dimensional Measurements of the Occlusal Surfaces of Upper Molars in a Dutch Population," J. Dent Res., 63(11):1298-1301 (Nov. 1984).
Kesling, Coordinating the Predetermined Pattern and Tooth Positioner with Conventional Treatment, KN Am. J. Orthod. Oral Surg. (1946) 32:285-293.
Kesling et al., The Philosophy of the Tooth Positioning Appliance, American Journal of Orthodontics and Oral surgery. 1945; 31:297-304.
Kleeman et al., The Speed Positioner, J. Clin. Orthod. (1996) 30:673-680.
Kochanek, "Interpolating Splines with Local Tension, Continuity and Bias Control," Computer Graphics, ri 18(3):33-41 (Jul. 1984).
KM Oral Surgery (1945) 31 :297-30.
Kunii et al., "Articulation Simulation for an Intelligent Dental Care System," Displays 15:181-188 (1994).
Kuroda et al., Three-Dimensional Dental Cast Analyzing System Using Laser Scanning, Am. J. Orthod. Dentofac. Orthop. (1996) 110:365-369.
Laurendeau, et al., "A Computer-Vision Technique for the Acquisition and Processing of 3-D Profiles of 7 KR Dental Imprints: An Application in Orthodontics," IEEE Transactions on Medical Imaging, 10(3):453-461 (Sep. 1991.
Leinfelder, et al., "A New Method for Generating Ceramic Restorations: a CAD-CAM System," J. Am. 1-1 Dent. Assoc., 118(6):703-707 (Jun. 1989).
Manetti et al., "Computer-Aided Cefalometry and New Mechanics in Orthodontics," (Article Summary in English, article in German), Fortschr Kieferorthop. 44, 370-376 (Nr. 5), 1983.
McCann, "Inside the ADA," J. Amer. Dent. Assoc., 118:286-294 (Mar. 1989).
McNamara et al., "Invisible Retainers," J. Cfin. Orthod., pp. 570-578 (Aug. 1985).
McNamara et al., Orthodontic and Orthopedic Treatment in the Mixed Dentition, Needham Press, pp. 347-353 (Jan. 1993).
Moermann et al., "Computer Machined Adhesive Porcelain Inlays: Margin Adaptation after Fatigue Stress," IADR Abstract 339, J. Dent. Res., 66(a):763 (1987).
Moles, "Correcting Mild Malalignments—As Easy As One, Two, Three," AOA/Pro Corner, vol. 11, No. 1, 2 pages (2002).
Mormann et al., "Marginale Adaptation von adhasuven Porzellaninlays in vitro," Separatdruck aus: Schweiz. Mschr. Zahnmed. 95: 1118-1129, 1985.
Nahoum, "The Vacuum Formed Dental Contour Appliance," N. Y. State Dent. J., 30(9):385-390 (Nov. 1964).
Nash, "CEREC CAD/CAM Inlays: Aesthetics and Durability in a Single Appointment," Dent. Today, 9(8):20, 22-23 (Oct. 1990).
Nishiyama et al., "A New Construction of Tooth Repositioner by LTV Vinyl Silicone Rubber," J. Nihon Univ. Sch. Dent., 19(2):93-102 (1977).
Paul et al., "Digital Documentation of Individual Human Jaw and Tooth Forms for Applications in Orthodontics, Oral Surgery and Forensic Medicine" Proc. of the 24th Annual Conf. of the IEEE Industrial Electronics Society (IECON '98), Sep. 4, 1998, pp. 2415-2418.
Pinkham, "Foolish Concept Propels Technology," Dentist, 3 pages total, Jan./Feb. 1989.
Pinkham, "Inventor's CAD/CAM May Transform Dentistry," Dentist, 3 pages total, Sep. 1990.
Ponitz, "Invisible Retainers," Am. J. Orthod., 59(3):266-272 (Mar. 1971).
Procera Research Projects, "Procera Research Projects 1993—Abstract Collection," pp. 3-7; 28 (1993).
Proffit et al., Contemporary Orthodontics, (Second Ed.), Chapter 15, Mosby Inc., pp. 470-533 (Oct. 1993.
Raintree Essix & ARS Materials, Inc., Raintree Essix, Technical Magazine Table of contents and Essix Appliances,< http://www.essix.com/magazine/defaulthtml> Aug. 13, 1997.
Redmond et al., "Clinical Implications of Digital Orthodontics," Am. J. Orthod. Dentofacial Orthop., 117(2):240-242 (2000).
Rekow, "A Review of the Developments in Dental CAD/CAM Systems," (contains references to Japanese efforts and content of the papers of particular interest to the clinician are indicated with a one line summary of their content in the bibliography), Curr. Opin. Dent., 2:25-33 (Jun. 1992).
Rekow, "CAD/CAM in Dentistry: A Historical Perspective and View of the Future," J. Can. Dent. Assoc., 58(4):283, 287-288 (Apr. 1992).
Rekow, "Computer-Aided Design and Manufacturing in Dentistry: A Review of the State of the Art," J. Prosthet. Dent., 58(4):512-516 (Oct. 1987).
Rekow, "Dental CAD-CAM Systems: What is the State of the Art?", J. Amer. Dent. Assoc., 122:43-48 1991.
Rekow et al., "CAD/CAM for Dental Restorations—Some of the Curious Challenges," IEEE Trans. Biomed. Eng., 38(4):314-318 (Apr. 1991).
Rekow et al., "Comparison of Three Data Acquisition Techniques for 3-D Tooth Surface Mapping," Annual International Conference of the IEEE Engineering in Medicine and Biology Society, 13(1):344-345 1991.
Rekow, "Feasibility of an Automated System for Production of Dental Restorations, Ph.D. Thesis," Univ. of Minnesota, 244 pages total, Nov. 1988.
Richmond et al., "The Development of a 3D Cast Analysis System," Br. J. Orthod., 13(1):53-54 (Jan. 1986).
Richmond et al., "The Development of the PAR Index (Peer Assessment Rating): Reliability and Validity," Eur. J. Orthod., 14:125-139 (1992).
Richmond, "Recording The Dental Cast In Three Dimensions," Am. J. Orthod. Dentofacial Orthop., 92(3):199-206 (Sep. 1987).
Rudge, "Dental Arch Analysis: Arch Form, A Review of the Literature," Eur. J. Orthod., 3(4):279-284 1981.
Sakuda et al., "Integrated Information-Processing System In Clinical Orthodontics: An Approach with Use of a Computer Network System," Am. J. Orthod. Dentofacial Orthop., 101(3): 210-220 (Mar. 1992).
Schellhas et al., "Three-Dimensional Computed Tomography in Maxillofacial Surgical Planning," Arch. Otolamp!. Head Neck Sur9., 114:438-442 (Apr. 1988).
Schroeder et al., Eds. The Visual Toolkit, Prentice Hall PTR, New Jersey (1998) Chapters 6, 8 & 9, (pp. 153-210,309-354, and 355-428, respectively.
Shilliday, (1971). Minimizing finishing problems with the mini-positioner, Am. J. Orthod. 59:596-599.
Siemens, "CEREC—Computer-Reconstruction," High Tech in der Zahnmedizin, 14 pages total (2004).
Sinclair, "The Readers' Corner," J. Clin. Orthod., 26(6):369-372 (Jun. 1992).
Sirona Dental Systems GmbH, CEREC 3D, Manuel utiiisateur, Version 2.0X (in French), 2003,114 pages total.
Stoll et al., "Computer-aided Technologies in Dentistry," (article summary in English, article in German), Dtsch Zahna'rztl Z 45, pp. 314-322 (1990).
Sturman, "Interactive Keyframe Animation of 3-D Articulated Models," Proceedings Graphics Interface '84, May-Jun. 1984, pp. 35-40.
The Choice Is Clear: Red, White & Blue . . . The Simple, Affordable, No-Braces Treatment, Allesee HI Orthodontic Appliances—Pro Lab product information for doctors. http://ormco.com/aoa/appliancesservices/RWB/doctorhtml>, 5 pages (May 19, 2003).
The Choice is Clear: Red, White & Blue . . . The Simple, Affordable, No-Braces Treatment, Allesee HJ Orthodontic Appliances—Pro Lab product information for patients,< http://ormco.com/aoa/appliancesservices/RWB/patients.html>, 2 pages (May 19, 2003).
The Choice Is Clear: Red, White & Blue . . . The Simple, Affordable, No-Braces Treatment, Allesee Orthodontic Appliances—Pro Lab product information, 6 pages (2003).
The Red, White & Blue Way to Improve Your Smile! Allesee Orthodontic Appliances—Pro Lab product information for patients, 2 pages 1992.

(56) References Cited

OTHER PUBLICATIONS

Truax L., "Truax Clasp-Less(TM) Appliance System," Funct. Orthod., 9(5):22-4, 26-8 (Sep.-Oct. 1992).
Tru-Tain Orthodontic & Dental Supplies, Product Brochure, Rochester, Minnesota 55902, 16 pages total (1996).
U.S. Department of Commerce, National Technical Information Service, "Automated Crown Replication Using Solid Photography SM," Solid Photography Inc., Melville NY, Oct. 1977, 20 pages total.
U.S. Department of Commerce, National Technical Information Service, "Holodontography: An Introduction to Dental Laser Holography," School of Aerospace Medicine Brooks AFB Tex, Mar. 1973, 37 pages total.
U.S. Appl. No. 60/050,342, filed Jun. 20, 1997, 41 pages total.
Van Der Linden, "A New Method to Determine Tooth Positions and Dental Arch Dimensions," J. Dent. Res., 51(4):1104 (Jul.-Aug. 1972).
Van Der Linden et al., "Three-Dimensional Analysis of Dental Casts by Means of the Optocom," J. Dent. Res., p. 1100 (Jul.-Aug. 1972).
Van Der Zel, "Ceramic-Fused-to-Metal Restorations with a New CAD/CAM System," Quintessence Int., 24(11):769-778 (1993.
Varady et al., "Reverse Engineering Of Geometric Models—An Introduction," Computer-Aided Design, 29(4):255-268, 1997.
Verstreken et al., "An Image-Guided Planning System for Endosseous Oral Implants," IEEE Trans. Med. Imaging, 17(5):842-852 (Oct. 1998).
Warunek et al., Physical and Mechanical Properties of Elastomers in Orthodonic Positioners, Am J. Orthod. Dentofac. Orthop, vol. 95, No. 5, (May 1989) pp. 399-400.
Warunek et.al., Clinical Use of Silicone Elastomer Applicances, JCO (1989) XXIII(10):694-700.
Wells, Application of the Positioner Appliance in Orthodontic Treatment, Am. J. Orthodont. (1970) 58:351-366.
Williams, "Dentistry and CAD/CAM: Another French Revolution," J. Dent. Practice Admin., pp. 2-5 (Jan./Mar. 1987).
Williams, "The Switzerland and Minnesota Developments in CAD/CAM," J. Dent. Practice Admin., pp. 50-55 (Apr./Jun. 1987.
Wishan, "New Advances in Personal Computer Applications for Cephalometric Analysis, Growth Prediction, Surgical Treatment Planning and Imaging Processing," Symposium: Computerized Facial Imaging in Oral and Maxilofacial Surgery Presented on Sep. 13, 1990.
WSCG'98—Conference Program, "The Sixth International Conference in Central Europe on Computer Graphics and Visualization '98," Feb. 9-13, 1998, pp. 1-7, retrieved from the Internet on Nov. 5, 2004, URL<http://wscg.zcu.cz/wscg98/wscg98.h>.
Xia et al., "Three-Dimensional Virtual-Reality Surgical Planning and Soft-Tissue Prediction for Orthognathic Surgery," IEEE Trans. Inf. Technol. Biomed., 5(2):97-107 (Jun. 2001).
Yamamoto et al., "Optical Measurement of Dental Cast Profile and Application to Analysis of Three-Dimensional Tooth Movement in Orthodontics," Front. Med. Biol. Eng., 1(2):119-130 (1988).
Yamamoto et al., "Three-Dimensional Measurement of Dental Cast Profiles and Its Applications to Orthodontics," Conf. Proc. IEEE Eng. Med. Biol. Soc., 12(5):2051-2053 (1990).
Yamany et al., "A System for Human Jaw Modeling Using Intra-Oral Images," Proc. of the 20th Annual Conf. of the IEEE Engineering in Medicine and Biology Society, Nov. 1, 1998, vol. 2, pp. 563-566.
Yoshii, "Research on a New Orthodontic Appliance: The Dynamic Positioner (D.P.); I. The D.P. Concept and Implementation of Transparent Silicone Resin (Orthocon)," Nippon Dental Review, 452:61-74 (Jun. 1980).
Yoshii, "Research on a New Orthodontic Appliance: The Dynamic Positioner (D.P.); II. The D.P. Manufacturing Procedure and Clinical Applications," Nippon Dental Review, 454:107-130 (Aug. 1980).
Yoshii, "Research on a New Orthodontic Appliance: The Dynamic Positioner (D.P.); III. The General Concept of the D.P. Method and Its Therapeutic Effect, Part 1, Dental and Functional Reversed Occlusion Case Reports," Nippon Dental Review, 457:146-164 (Nov. 1980).
Yoshii, "Research on a New Orthodontic Appliance: The Dynamic Positioner (D.P.); III.—The General Concept of the D.P. Method and Its Therapeutic Effect, Part 2. Skeletal Reversed Occlusion Case Reports," Nippon Dental Review, 458:112-129 (Dec. 1980).
You May Be A Candidate For This Invisible No-Braces Treatment, Allesee Orthodontic Appliances—Pro Lab product information for patients, 2 pages (2002).

\* cited by examiner

SYSTEMS, METHODS, AND APPARATUS FOR CORRECTING MALOCCLUSIONS OF TEETH

CROSS-REFERENCE

This application claims the benefit of U.S. Provisional Application No. 62/547,004, filed Aug. 17, 2017, which application is incorporated herein by reference.

BACKGROUND OF THE INVENTION

Treatment planning and aligner fabrication is a linear, back and forth process between with delays between the provision of feedback and revised treatment plans and requires specialized knowledge in order to indicate what malocclusions of a patient's teeth are to be corrected. This process is less than ideal in that it leaves room for errors in the treatment planning process.

SUMMARY

A method of manufacturing an orthodontic appliance is disclosed. The method may include measuring the positions of a patient's teeth and receiving tooth movement constraints. The method may also include measuring a first element of a patient's malocclusion of the patient's teeth for one or more types of dental malocclusions and generating a plurality of treatment plans based on the measured tooth positions and the tooth movement constraints. A first interim final position for each of the plurality of treatment plans may be generated. A second element of the patient's malocclusion in the first interim final position for a plurality of treatment plans may be measured and the first interim final position for each of the plurality of treatment plans to correct the element of the patient's malocclusion and generate a final position for each of the plurality of treatment plans may be generated. The method may also include selecting a treatment plan from the plurality of treatment plans and generating a model of an appliance for each stage of the selected treatment plan. Instructions for fabricating the appliance for each stage of the selected treatment plan based on the model of the appliance for each stage of the selected treatment plan may be output.

In some embodiments, the method may include fabricating the appliances for one or more stages of the selected treatment plan, from the instructions for fabricating the respective appliance.

In some embodiments, the method may include generating, for each treatment plan, two new treatment plans, a first new treatment plan wherein bicuspids are extracted and a second new treatment plan wherein bicuspids are not extracted and determining second interim final tooth positions for each of the first and second new treatment plans of each of the plurality of treatment plans.

In some embodiments, the method may include measuring the positions of the molars in each of the first and second new treatment plans of each of the plurality of treatment plans for determine the molar class occlusion for each treatment plan.

In some embodiments, for each treatment plan, if a molar class II, class III, or mixed class II and III malocclusion is present in the second interim final tooth positions, the method may include correcting or improving the molar malocclusion and generating a third interim final tooth positions for each of the first and second new treatment plans of each of the plurality of treatment plans.

In some embodiments, the method may include measuring the positions of the canines in each of the first and second new treatment plans of each of the plurality of treatment plans for determine the canine class occlusion for each treatment plan.

In some embodiments, for each treatment plan, if a canine class II, class III, or mixed class II and III malocclusion is present in the second interim final tooth positions, the method may include correcting or improving the canine malocclusion and generate a third interim final tooth positions for each of the first and second new treatment plans of each of the plurality of treatment plans.

In some embodiments, for each treatment plan, a third and a fourth new treatment plan may be generated based on the presence and strength of the class II or class III canine occlusion, the third new treatment plan including bicuspid extraction and the fourth new treatment plan not including bicuspid extraction.

In some embodiments, the method may include measuring the positions of the teeth in each of the first and second new treatment plans of each of the plurality of treatment plans based on the second interim final tooth positions for each treatment plan for determining the amount of overjet for each treatment plan.

In some embodiments, for each treatment plan, a third and a fourth new treatment plan may be generated based on the amount of upper buccal and lower lingual overjet, the third new treatment plan including lower anterior interproximal reduction and the fourth new treatment plan including correction of upper anterior spaces.

In some embodiments, for each treatment plan, the method may include determining third interim final tooth positions.

A system for manufacturing an orthodontic appliance is disclosed. The system may include a processor and memory including instructions that when executed by the process cause the system to: measure the positions of a patient's teeth, receive tooth movement constraints, measure a first element of a patient's malocclusion of the patient's teeth for one or more types of dental malocclusions, generate a plurality of treatment plans based on the measured tooth positions and the tooth movement constraints, generate a first interim final position for each of the plurality of treatment plans, measure a second element of the patient's malocclusion in the first interim final position for a plurality of treatment plans, modify the first interim final position for each of the plurality of treatment plans to correct the element of the patient's malocclusion and generate a final position for each of the plurality of treatment plans, select a treatment plan from the plurality of treatment plans, generate a model of an appliance for each stage of the selected treatment plan, and output instructions for fabricating the appliance for each stage of the selected treatment plan based on the model of the appliance for each stage of the selected treatment plan.

In some embodiments, the instructions further cause the system to fabricate the appliances for one or more stages of the treatment plan, from the instructions for fabricating the respective appliance.

The instructions may also further cause the system to generate, for each treatment plan, two new treatment plans, a first new treatment plan wherein bicuspids are extracted and a second new treatment plan wherein bicuspids are not extracted, and determine second interim final tooth positions for each of the first and second new treatment plans of each of the plurality of treatment plans.

In some embodiments, the instructions further cause the system to measure the positions of the molars in each of the first and second new treatment plans of each of the plurality of treatment plans for determine the molar class occlusion for each treatment plan.

In some embodiments, for each treatment plan, if a molar class II, class III, or mixed class II and III malocclusion is present in the second interim final tooth positions, the instructions further cause the system to correct or improve the molar malocclusion, and generate a third interim final tooth positions for each of the first and second new treatment plans of each of the plurality of treatment plans.

In some embodiments, the instructions further cause the system to measure the positions of the canines in each of the first and second new treatment plans of each of the plurality of treatment plans for determine the canine class occlusion for each treatment plan.

In some embodiment, for each treatment plan, if a canine class II, class III, or mixed class II and III malocclusion is present in the second interim final tooth position, the instructions further cause the system to correct or improving the canine malocclusion, and generate a third interim final tooth positions for each of the first and second new treatment plans of each of the plurality of treatment plans.

In some embodiments, for each treatment plan the instructions further cause the system to generate a third and a fourth new treatment plan based on the presence and strength of the class II or class III canine occlusion, the third new treatment plan including bicuspid extraction and the fourth new treatment plan not including bicuspid extraction.

In some embodiments, the instructions further cause the system to measure the positions of the teeth in each of the first and second new treatment plans of each of the plurality of treatment plans based on the second interim final tooth positions for each treatment plan for determining the amount of overjet for each treatment plan.

In some embodiments, for each treatment plan, the instructions further cause the system to generate a third and a fourth new treatment plan based on the amount of upper buccal and lower lingual overjet, the third new treatment plan including lower anterior interproximal reduction and the fourth new treatment plan including correction of upper anterior spaces.

In some embodiments, for each treatment plan, the instructions further cause the system to determine third interim final tooth positions.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the invention are utilized, and the accompanying drawings of which:

DETAILED DESCRIPTION

Figure 1A:
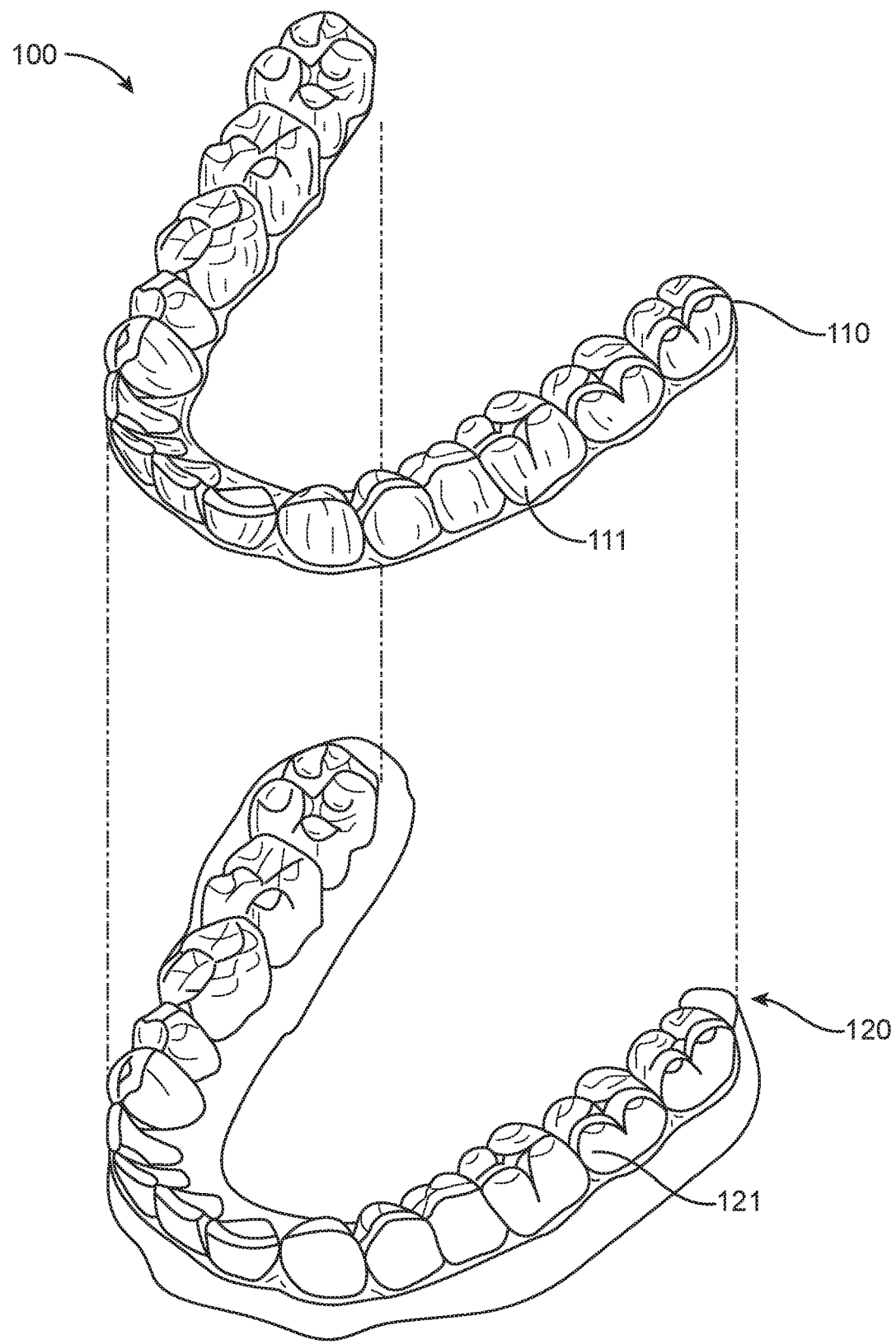
FIG. 1A illustrates a tooth repositioning appliance, in accordance with one or more embodiments herein.

FIG. 1A illustrates an exemplary tooth repositioning appliance or aligner 100 that can be worn by a patient in order to achieve an incremental repositioning of individual teeth 121 in the jaw. The appliance can include a shell 110 (e.g., a continuous polymeric shell or a segmented shell) having teeth-receiving cavities 111 that receive and resiliently reposition the teeth 121. An appliance or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using additive manufacturing techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance may be repositioned by the appliance while other teeth can provide a base or anchor region for holding the appliance in place as it applies force against the tooth or teeth targeted for repositioning. In some cases, some or most, and even all, of the teeth may be repositioned at some point during treatment. Teeth that are moved can also serve as a base or anchor for holding the appliance as it is worn by the patient. Typically, no wires or other means may be provided for holding an appliance in place over the teeth. In some cases, however, it may be desirable or necessary to provide individual attachments or other aligner features for controlling force delivery and distribution. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Optionally, in cases involving more complex movements or treatment plans, it may be beneficial to utilize auxiliary components (e.g., features, accessories, structures, devices, components, and the like) in conjunction with an orthodontic appliance. Examples of such accessories include but are not limited to elastics, wires, springs, bars, arch expanders, palatal expanders, twin blocks, occlusal blocks, bite ramps, mandibular advancement splints, bite plates, pontics, hooks, brackets, headgear tubes, springs, bumper tubes, palatal bars, frameworks, pin-and-tube apparatuses, buccal shields, buccinator bows, wire shields, lingual flanges and pads, lip pads or bumpers, protrusions, divots, and the like. Additional examples of accessories include but are not limited to opposing arch features, occlusal features, torsional rigidity features, occlusal cusp, and bridges. In some embodiments, the appliances, systems and methods described herein include improved orthodontic appliances with integrally formed features that are shaped to couple to such auxiliary components, or that replace such auxiliary components.

Figure 1B:
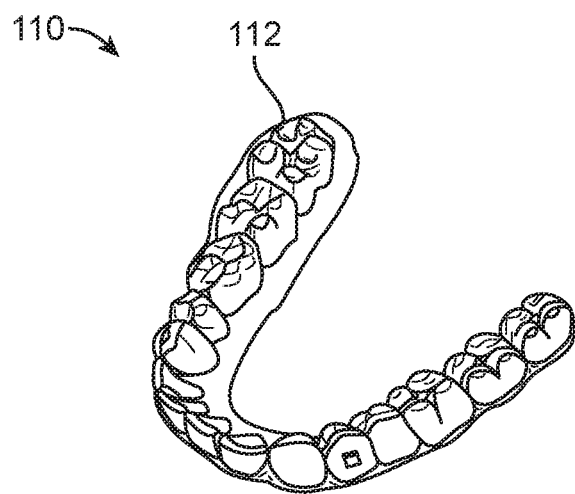
FIG. 1B illustrates a tooth repositioning system, in accordance with one or more embodiments herein.
Figure 1B:
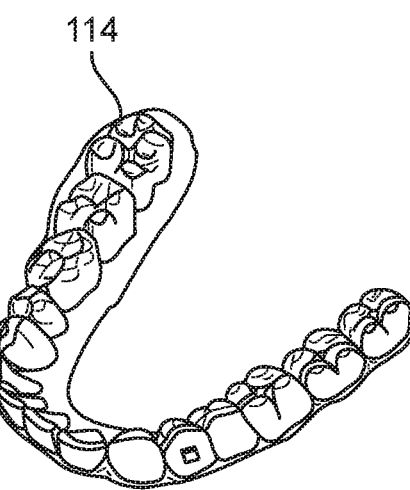
Figure 1B:
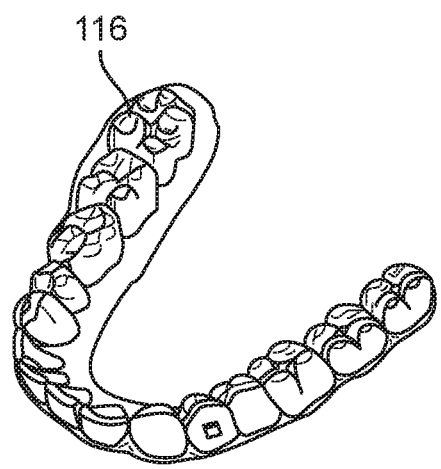

FIG. 1B illustrates a tooth repositioning system 110 including a plurality of appliances 112, 114, 116. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement towards a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 1C:
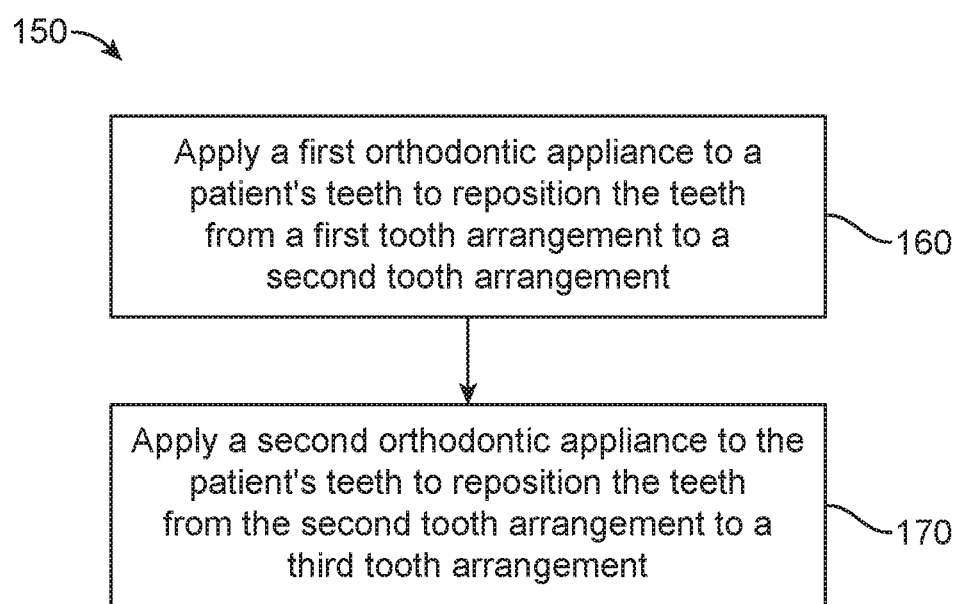
FIG. 1C illustrates a method of orthodontic treatment using a plurality of appliances, in accordance with one or more embodiments herein.

FIG. 1C illustrates a method 150 of orthodontic treatment using a plurality of appliances, in accordance with embodiments. The method 150 can be practiced using any of the appliances or appliance sets described herein. In step 160, a first orthodontic appliance is applied to a patient's teeth in order to reposition the teeth from a first tooth arrangement to a second tooth arrangement. In step 170, a second orthodontic appliance is applied to the patient's teeth in order to reposition the teeth from the second tooth arrangement to a third tooth arrangement. The method 150 can be repeated as necessary using any suitable number and combination of sequential appliances in order to incrementally reposition the patient's teeth from an initial arrangement towards a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

The various embodiments of the orthodontic appliances presented herein can be fabricated in a wide variety of ways. In some embodiments, the orthodontic appliances herein (or portions thereof) can be produced using direct fabrication, such as additive manufacturing techniques (also referred to herein as "3D printing) or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. For example, stereolithography can be used to directly fabricate one or more of the appliances herein. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances herein can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances herein can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances herein. In some embodiments, material jetting involves jetting or extruding one or more materials onto a build surface in order to form successive layers of the object geometry.

In some embodiments, the direct fabrication methods provided herein build up the object geometry in a layer-by-layer fashion, with successive layers being formed in discrete build steps. Alternatively or in combination, direct fabrication methods that allow for continuous build-up of an object's geometry can be used, referred to herein as "continuous direct fabrication." Various types of continuous direct fabrication methods can be used. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step using the same fabrication machine and method. For instance, a multi-tip extrusion apparatus can be used to selectively dispense multiple types of materials (e.g., resins, liquids, solids, or combinations thereof) from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, then a second portion of the object can be formed from a second material in accordance with methods herein, and so on, until the entirety of the object has been formed.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

Although various embodiments herein are described with respect to direct fabrication techniques, it shall be appreciated that other techniques can also be used, such as indirect fabrication techniques. In some embodiments, the appliances herein (or portions thereof) can be produced using indirect fabrication techniques, such as by thermoforming over a positive or negative mold. Indirect fabrication of an orthodontic appliance can involve one or more of the following steps: producing a positive or negative mold of the patient's dentition in a target arrangement (e.g., by additive manufacturing, milling, etc.), thermoforming one or more sheets of material over the mold in order to generate an appliance shell, forming one or more structures in the shell (e.g., by cutting, etching, etc.), and/or coupling one or more components to the shell (e.g., by extrusion, additive manufacturing, spraying, thermoforming, adhesives, bonding, fasteners, etc.). Optionally, one or more auxiliary appliance components as described herein (e.g., elastics, wires, springs, bars, arch expanders, palatal expanders, twin blocks, occlusal blocks, bite ramps, mandibular advancement splints, bite plates, pontics, hooks, brackets, headgear tubes, bumper tubes, palatal bars, frameworks, pin-and-tube apparatuses, buccal shields; buccinator bows, wire shields, lingual flanges and pads, lip pads or bumpers, protrusions, divots, etc.) are formed separately from and coupled to the appliance shell (e.g., via adhesives, bonding, fasteners, mounting features, etc.) after the shell has been fabricated.

In some embodiments, the orthodontic appliances herein can be fabricated using a combination of direct and indirect fabrication techniques, such that different portions of an appliance can be fabricated using different fabrication techniques and assembled in order to form the final appliance. For example, an appliance shell can be formed by indirect fabrication (e.g., thermoforming), and one or more structures or components as described herein (e.g., auxiliary components, power arms, etc.) can be added to the shell by direct fabrication (e.g., printing onto the shell).

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled additive manufacturing such as 3D printing, etc.). The computer-based methods presented herein can improve the accuracy, flexibility, and convenience of appliance fabrication.

In some embodiments, computer-based 3-dimensional planning/design tools, such as Treat™ software from Align Technology, Inc., may be used to design and fabricate the orthodontic appliances described herein.

Figure 2:
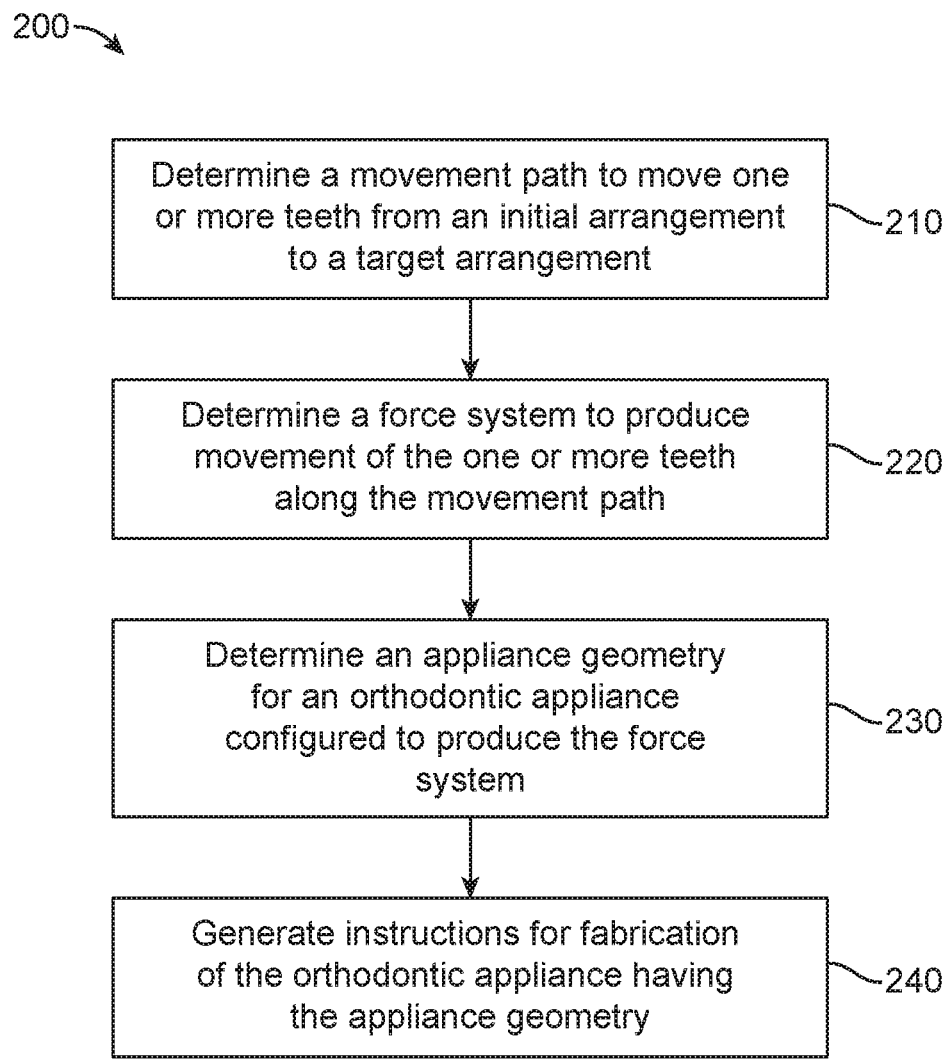
FIG. 2 illustrates a method for determining the geometry of an orthodontic appliance, in accordance with one or more embodiments herein.

FIG. 2 illustrates a method 200 for designing an orthodontic appliance to be fabricated, in accordance with embodiments. The method 200 can be applied to any embodiment of the orthodontic appliances described herein. Some or all of the steps of the method 200 can be performed by any suitable data processing system or device, e.g., one or more processors configured with suitable instructions.

In step 210, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In step 220, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

Determination of the force system can be performed in a variety of ways. For example, in some embodiments, the force system is determined on a patient-by-patient basis, e.g., using patient-specific data. Alternatively or in combination, the force system can be determined based on a generalized model of tooth movement (e.g., based on experimentation, modeling, clinical data, etc.), such that patient-specific data is not necessarily used. In some embodiments, determination of a force system involves calculating specific force values to be applied to one or more teeth to produce a particular movement. Alternatively, determination of a force system can be performed at a high level without calculating specific force values for the teeth. For instance, step 220 can involve determining a particular type of force to be applied (e.g., extrusive force, intrusive force, translational force, rotational force, tipping force, torquing force, etc.) without calculating the specific magnitude and/or direction of the force.

In step 230, an appliance geometry and/or material composition for an orthodontic appliance configured to produce the force system is determined. The appliance can be any embodiment of the appliances discussed herein, such as an appliance having variable localized properties, integrally formed components, and/or power arms.

For example, in some embodiments, the appliance comprises a heterogeneous thickness, a heterogeneous stiffness, or a heterogeneous material composition. In some embodiments, the appliance comprises two or more of a heterogeneous thickness, a heterogeneous stiffness, or a heterogeneous material composition. In some embodiments, the appliance comprises a heterogeneous thickness, a heterogeneous stiffness, and a heterogeneous material composition. The heterogeneous thickness, stiffness, and/or material composition can be configured to produce the force system for moving the teeth, e.g., by preferentially applying forces at certain locations on the teeth. For example, an appliance with heterogeneous thickness can include thicker portions that apply more force on the teeth than thinner portions. As another example, an appliance with heterogeneous stiffness can include stiffer portions that apply more force on the teeth than more elastic portions. Variations in stiffness can be achieved by varying the appliance thickness, material composition, and/or degree of photopolymerization, as described herein.

In some embodiments, determining the appliance geometry and/or material composition comprises determining the geometry and/or material composition of one or more integrally formed components to be directly fabricated with an appliance shell. The integrally formed component can be any of the embodiments described herein. The geometry and/or material composition of the integrally formed component(s) can be selected to facilitate application of the force system onto the patient's teeth. The material composition of the integrally formed component can be the same as or different from the material composition of the shell.

In some embodiments, determining the appliance geometry comprises determining the geometry for a customized aligner-teeth geometric interference.

The step 230 can involve analyzing the desired force system in order to determine an appliance geometry and material composition that would produce the force system. In some embodiments, the analysis involves determining appliance properties (e.g., stiffness) at one or more locations that would produce a desired force at the one or more locations. The analysis can then involve determining an appliance geometry and material composition at the one or more locations to achieve the specified properties. Determination of the appliance geometry and material composition can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, Calif. For creating finite element models and analyzing them, program products from a number of vendors can be used, including finite element analysis packages from ANSYS, Inc., of Canonsburg, Pa., and SIMULIA (Abaqus) software products from Dassault Systèmes of Waltham, Mass.

Optionally, one or more appliance geometries and material compositions can be selected for testing or force modeling. As noted above, a desired tooth movement, as well as a force system required or desired for eliciting the desired tooth movement, can be identified. Using the simulation environment, a candidate appliance geometry and composition can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

Optionally, step 230 can further involve determining the geometry of one or more auxiliary components to be used in combination with the orthodontic appliance in order to exert the force system on the one or more teeth. Such auxiliaries can include one or more of tooth-mounted attachments, elastics, wires, springs, bite blocks, arch expanders, wire-and-bracket appliances, shell appliances, headgear, or any other orthodontic device or system that can be used in conjunction with the orthodontic appliances herein. The use of such auxiliary components may be advantageous in situations where it is difficult for the appliance alone to produce the force system. Additionally, auxiliary components can be added to the orthodontic appliance in order to provide other desired functionalities besides producing the force system, such as mandibular advancement splints to treat sleep apnea, pontics to improve aesthetic appearance, and so on. In some embodiments, the auxiliary components are fabricated and provided separately from the orthodontic appliance. Alternatively, the geometry of the orthodontic appliance can be modified to include one or more auxiliary components as integrally formed components.

In step 240, instructions for fabrication of the orthodontic appliance having the appliance geometry and material composition are generated. The instructions can be configured to control a fabrication system or device in order to produce the orthodontic appliance with the specified appliance geometry and material composition. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.). Optionally, the instructions can be configured to cause a fabrication machine to directly fabricate the orthodontic appliance with teeth receiving cavities having shapes, positions, and features, as discussed herein. In alternative embodiments, the instructions can be configured for indirect fabrication of the appliance, e.g., by thermoforming.

Although the above steps show a method 200 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 200 may be performed with any suitable fabrication system or device, such as the embodiments described herein. Some of the steps may be optional, and the order of the steps can be varied as desired. For instance, in some embodiments, step 220 is optional, such that step 230 involves determining the appliance geometry and/or material composition based directly on the tooth movement path rather than based on the force system.

Figure 3:
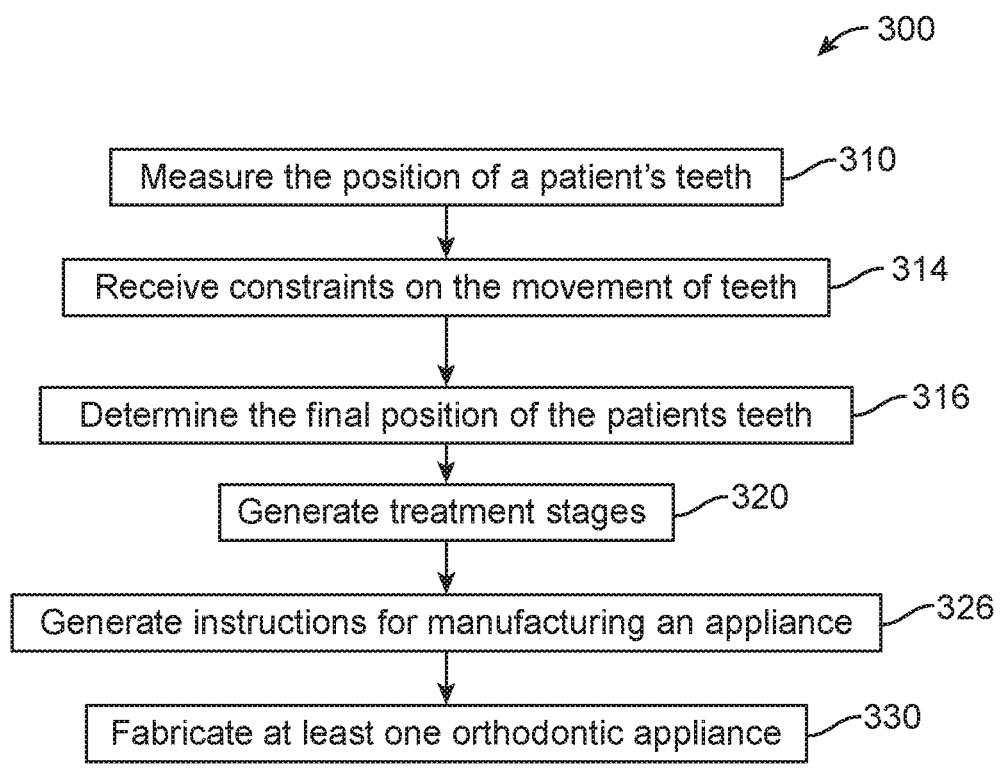
FIG. 3 illustrates a method for digitally planning orthodontic treatment and fabricating appliances, in accordance with one or more embodiments herein.

FIG. 3 illustrates a method 300 for digitally planning an orthodontic treatment and design and fabrication of an appliance, in accordance with embodiments. The method 300 can be applied to any of the treatment procedures described herein and can be performed by any suitable data processing system.

In step 310, the position of a patient's teeth is measured. The measurement can include measuring surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 314, constraints on the movement of teeth are received. Constraints may include a selection of teeth whose initial and final positions are the same. In some embodiments, these teeth may act as anchors during one or more stages of treatment or they may act as anchors throughout treatment. Teeth may also be designated as unmoving teeth because they are unsuitable for repositioning, for example, they may comprise prosthetic teeth, such as bridges, implants, crowns, ankylosed teeth, etc.

In step 316, the final position of teeth is determined. The final position of the patient's teeth may be determined based on one or more of the initial malocclusion of the patient's teeth, the patient's desired treatment, such as only movement of anterior teeth, etc. FIGS. 5A, 5B, and 6 to 11 describe the generation of the final position of a patients teeth in more detail. In some embodiments, a plurality of clinically meaningful treatment plans may be generated. One of the plurality of treatment plans may be selected for treatment of the patient.

In step 320, one or more treatment stages are generated based on the measured position of the patient's teeth, which may include a digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, the determined final position of the patient's teeth, and determining movement paths of one or more teeth in the initial arrangement to achieve the target tooth arrangement. The movement path can be optimized based on minimizing the total distance moved, preventing collisions between teeth, avoiding tooth movements that are more difficult to achieve, the malocclusions corrected as part of the treatment plan, or any other suitable criteria.

A plurality of treatment plans are presented to the dental professional who can then evaluate the treatment plans based on their professional preferences and those of the patient. A plan is then selected. The selected treatment plan may then be passed to step 326.

In step 326, instructions for fabricating an appliance may be generated. The instructions may be generated using the process 200 as shown and described above with respect to FIG. 2.

In step 330, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be used for design and/or fabrication of an appliance. As illustrated by the dashed line in FIG. 3, design and/or fabrication of an orthodontic appliance, and perhaps a particular orthodontic treatment, may include use of a representation of the patient's teeth, followed by design and/or fabrication of an orthodontic appliance based on a representation of the patient's teeth in the arrangement represented by the received representation.

Optionally, some or all of the steps of the method 300 are performed locally at the site where the patient is being treated or on a remote system during a single patient visit.

Figure 4:
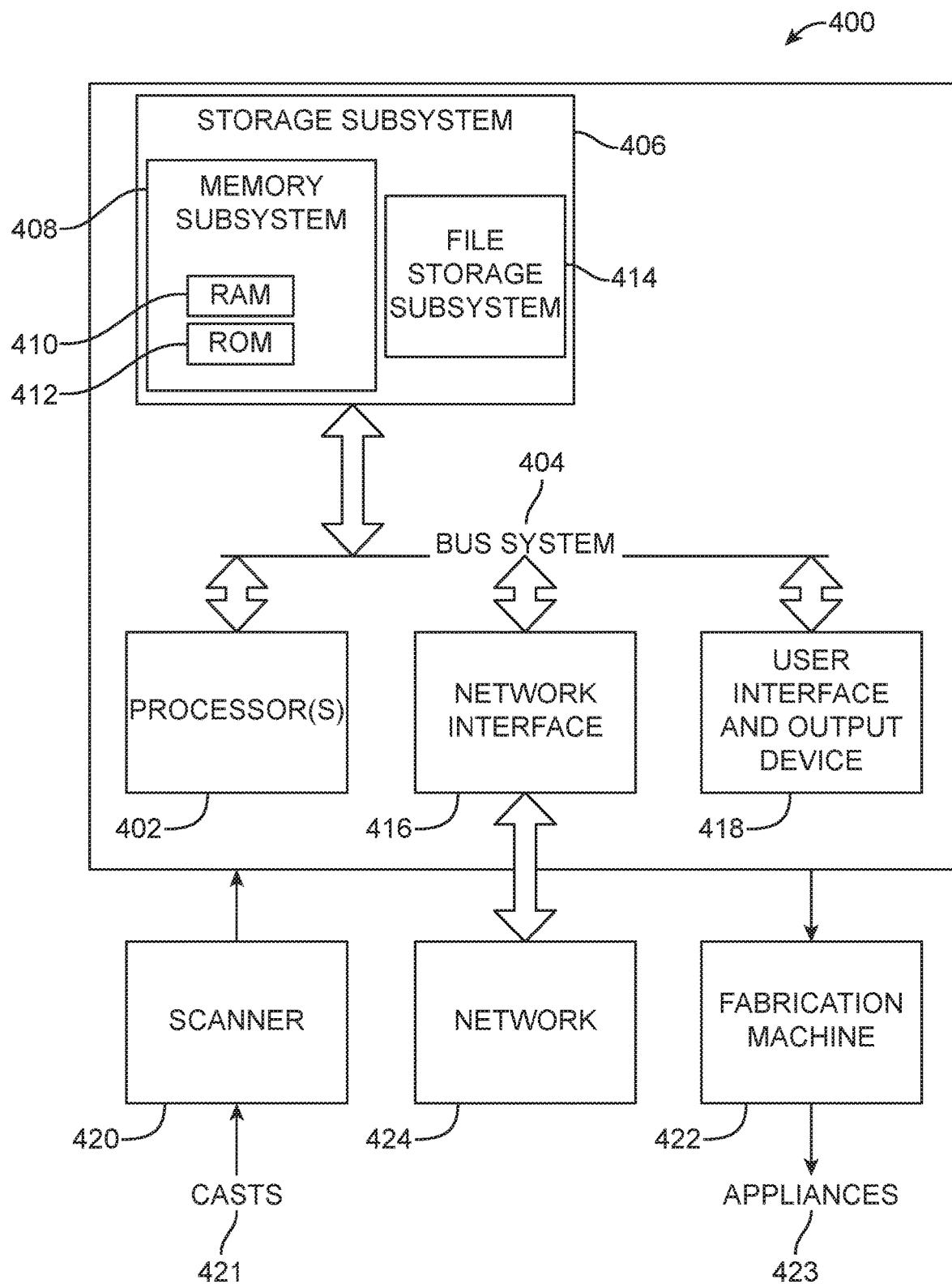
FIG. 4 illustrates a simplified block diagram of a data processing system, in accordance with one or more embodiments herein.

FIG. 4 is a simplified block diagram of a data processing system 400, one or more of which may be used in executing methods and processes described herein. The data processing system 400 typically includes at least one processor 402 that communicates with one or more peripheral devices via bus subsystem 404. These peripheral devices typically include a storage subsystem 406 (memory subsystem 408 and file storage subsystem 414), a set of user interface input and output devices 418, and an interface to outside networks 416. This interface is shown schematically as "Network Interface" block 416, and is coupled to corresponding interface devices in other data processing systems via communication network interface 424. Data processing system 400 can include, for example, one or more computers, such as a personal computer, workstation, mainframe, laptop, and the like.

The user interface input devices 418 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 406 maintains the basic required programming, including computer readable media having instructions (e.g., operating instructions, etc.), and data constructs. The program modules discussed herein are typically stored in storage subsystem 406. Storage subsystem 406 typically includes memory subsystem 408 and file storage subsystem 414. Memory subsystem 408 typically includes a number of memories (e.g., RAM 410, ROM 412, etc.) including computer readable memory for storage of fixed instructions, instructions and data during program execution, basic input/output system, etc. File storage subsystem 414 provides persistent (non-volatile) storage for program and data files, and can include one or more removable or fixed drives or media, hard disk, floppy disk, CD-ROM, DVD, optical drives, and the like. One or more of the storage systems, drives, etc may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It is recognized that various components of the system can be, but need not necessarily be at the same physical location, but could be connected via various local-area or wide-area network media, transmission systems, etc.

The system may include measurement devices, such as a scanner 420 which includes any means for obtaining a digital representation (e.g., images, surface topography data, etc.) of a patient's teeth (e.g., by scanning physical models of the teeth such as casts 421, by scanning impressions taken of the teeth, or by directly scanning the intraoral cavity), which can be obtained either from the patient or from treating professional, such as an orthodontist, and includes means of providing the digital representation to data processing system 400 for further processing. Scanner 420 may be located at a location remote with respect to other components of the system and can communicate image data and/or information to data processing system 400, for example, via a network interface 424. Fabrication system 422 fabricates appliances 423 based on a treatment plan, including data set information received from data processing system 400. Fabrication machine 422 can, for example, be located at a remote location and receive data set information from data processing system 400 via network interface 424.

The data processing aspects of the methods described herein can be implemented in digital electronic circuitry, or in computer hardware, firmware, software, or suitable combinations thereof. Data processing apparatus can be implemented in a computer program product tangibly embodied in a machine-readable storage device for execution by a programmable processor. Data processing steps can be performed by a programmable processor executing program instructions to perform functions by operating on input data and generating output. The data processing aspects can be implemented in one or more computer programs that are executable on a programmable system, the system including one or more programmable processors operably coupled to a data storage system. Generally, a processor may receive instructions and data from a read-only memory and/or a random access memory. Storage devices suitable for tangibly embodying computer program instructions and data include all forms of nonvolatile memory, such as: semiconductor memory devices, such as EPROM, EEPROM, and flash memory devices; magnetic disks such as internal hard disks and removable disks; magneto-optical disks; and CD-ROM disks.

Figure 5A:
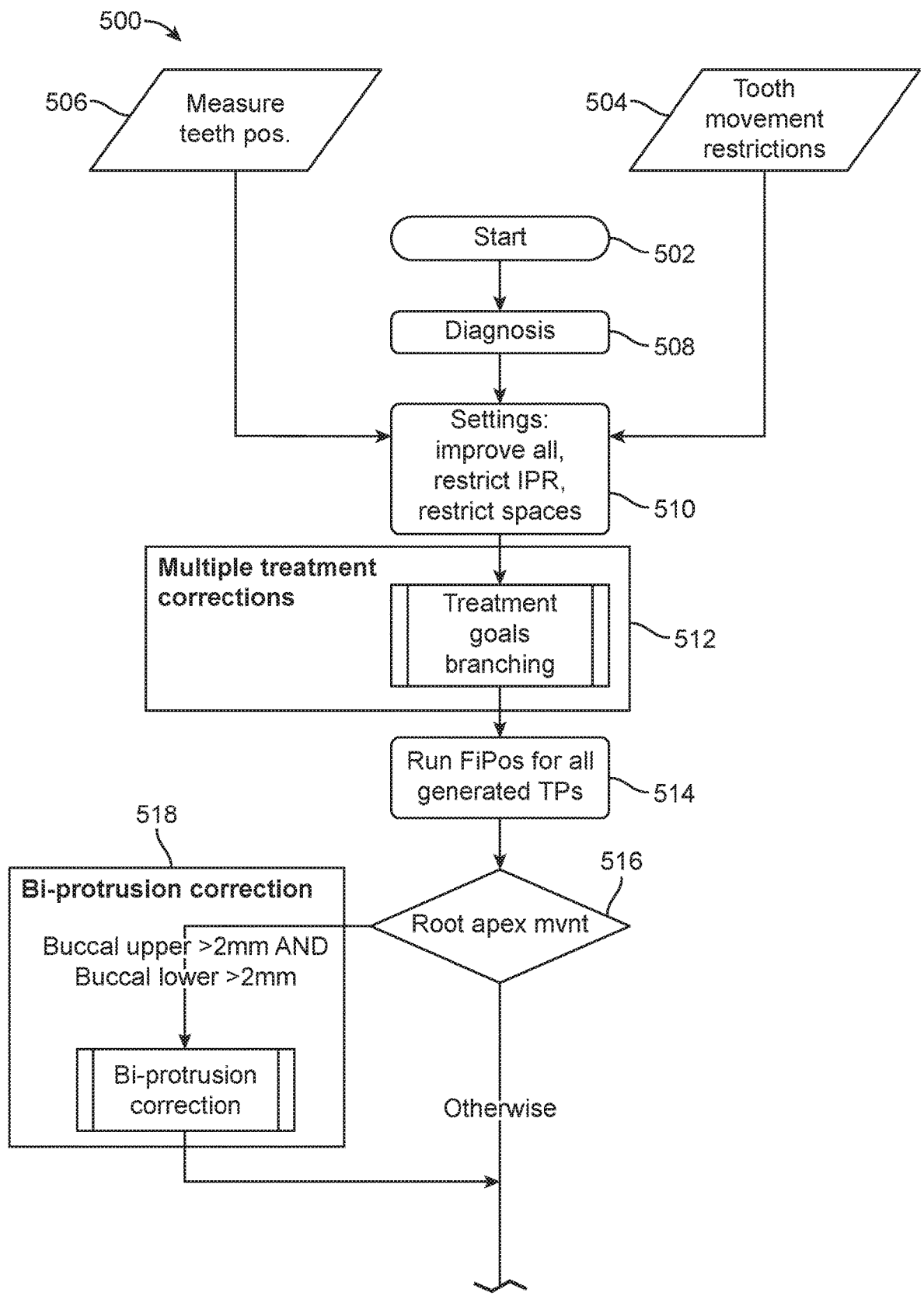
FIGS. 5A and 5B illustrate a method for digitally planning an orthodontic treatment and fabricating appliances, in accordance with one or more embodiments herein.
Figure 5B:
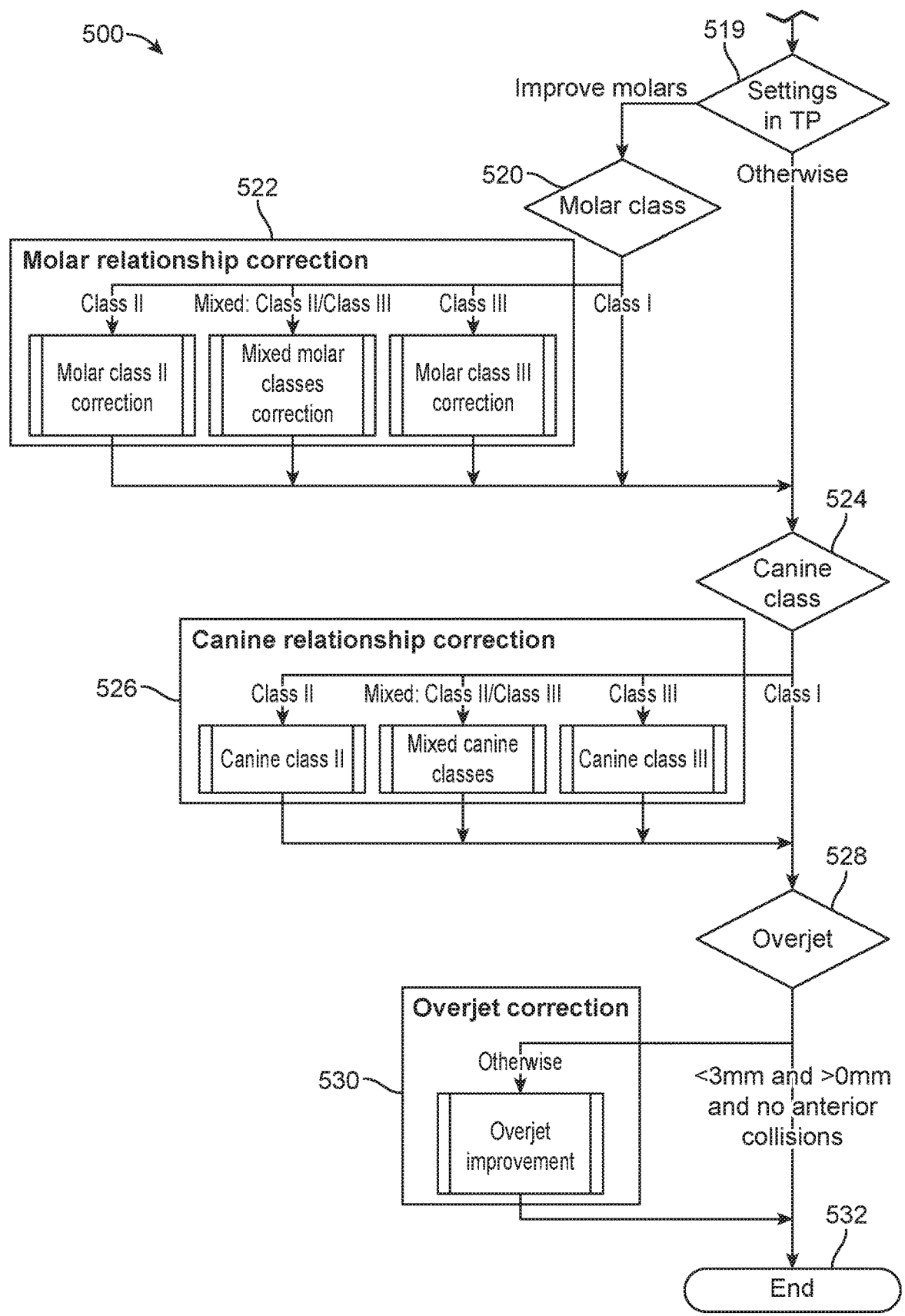

Referring now to FIGS. 5A and 5B, a method 500 for determining one or more treatment plans is shown. The steps of method 500 may be part of the method 300 for digitally planning an orthodontic treatment and design and fabrication of an appliance, as shown and described above with respect to FIG. 3. In particular, the steps of method 500 may be part of step 316 for determining the final position of the patient's teeth.

In step 502, the method 500 starts. In some embodiments, instructions stored on a computer readable medium that correspond to the steps in method 500 are executed by one or more processors, such as the processors shown and described with respect to FIG. 4, which then carries out one or more of the steps of the method 500.

At step 502, there may be only one treatment plan that is represented by initial or default settings for a treatment plan. During the steps of the process 500 one or more treatment plans pass from one step to the next, based on the conditions and actions performed at each step. When a step in the process creates a new branch of the treatment plan, one or more new, additional treatment plans are created. Each new treatment plan may inherit all the previous corrections and treatments indicated in the parent treatment plan, and then each new treatment plan continues through the process 500 to be modified based on the remaining steps in the process 500. In this way, many different treatment plans are generated and evaluated as options for treating a patient. Using a large data set of treatment plans, each being generated for a particular patient with a particular malocclusion, permits the parallel evaluation of a much wider range of potential treatments than previously available and results in proposed treatment plans that may not have been consider or presented to a treating professional in the past, thereby resulting in improved outcomes. Improved outcomes may include shorter treatment time, less invasive treatment, and avoidance of other less desirable treatments.

In FIGS. 5 to 11, the shapes of each process step in the figures indicate the action of each step. Parallelogram shaped steps do not affect treatment plan content, rectangles with rounded corners are actions performed on the plan passing through the block, for example improving overbite or indicating that overbite is to be improved in the treatment plan. Some rectangles with rounded corners are forking steps in which a treatment plan is branched or forked to create one or more new treatment plans having different treatment indications based on the properties of the fork. Each branched treatment plan is passed to the next step in the process.

In some embodiments, each treatment plan may include an initial position, final (or interim final) position, and settings associated with the treatment of malocclusion elements. In some embodiments, the treatment plan also includes the stages and/or tooth movement paths that move the teeth from the initial position to the final position, while in other embodiments, the treatment plans do not include the stages and tooth movement paths. For example, the tooth movement paths may be generated for the treatment plans at step 532.

Rhombus shaped steps are condition steps where a measured tooth position is validated against the plan and depending on the result, the block determines the next step to which the treatment plan flows. For example, if a molar class problem is diagnosed in a treatment plan that passes through step 520, then the plan is passed to step 522, otherwise, the plan is passed to step 524.

Rectangles with stripes at the left and right sides indicate that additional processes or procedures, such as a sub process, are executed for a treatment plan passed to the block.

In step 504, tooth movement restrictions are selected. A dental professional may select teeth that are to remain stationary relative to the other teeth in the mouth. In some embodiments, step 504, or at least part of step 504, may take place after scanning the teeth in step 506. At least some teeth may be selected automatically, based on their condition. For example, a tooth prepared for a crown or bridge, that does not have the crown or bridge applied during scanning may be selected automatically by the system without input from the dental professional. Prepared teeth are generally ill-suited for movement using shell appliances, therefore the system may identify the tooth based on its prepared shape, which does not correspond to the shape of a natural tooth, crown, or bridge.

In step 506, the position of a patient's teeth is measured. The measurement can include measuring surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 508, the malocclusions of the teeth are diagnosed. This may include additional measuring of the teeth or groups of teeth either relative to other teeth or relative to other facial structure or features and in various positions. For example, the amount of openbite may be measured based on a model of the upper and lower arches of the patient's teeth in normal occlusion. The amount of overjet of the molars, either positive or negative, may be measured for molar treatment. The amount of overjet or overbite may be measured for determining improvements to overbite. The amount of overjet of the canines may be measured for determining improvements to the position and location of the canines and other corrective measures, such as bicuspid extraction. Still other measurements of the teeth may be made to aid in correcting the malocclusions of a patient, as evidenced by the methods and steps described herein.

In step 510, the tooth movement restrictions and other treatment settings may be set, received, or read by the system. For example, the system or process may receive instructions to improve all malocclusions, to restrict interproximal reduction to certain teeth or groups of teeth, and to restrict spaces, e.g., allow or not allow spaces between the one or more of the patient's teeth in the final position. In some embodiments, the treatment planning process continues using only the measured teeth positions and tooth movement restrictions. In some embodiments, the treatment planning process continues using only the measured teeth positions, tooth movement restrictions, and one or more of the settings described herein.

In step 512, the degree of malocclusion for multiple elements of a patient's malocclusion is measured and the system determines whether a treatment branch is formed. The treatment branches may include branches for correction of the elements of a patient's malocclusion, such as openbite, major class problem diagnoses, posterior crossbite, among others may be formed, as shown and described with respect to FIG. 6, below. Each branch may branch a second time, third time, and so on. For example, two branches may be formed based on whether to treat an openbite type malocclusion or maintain the openbite. The openbite treatment branch and the maintain openbite branch may each then branch again based on whether the molar relationship is maintained or improved. The resulting four branches may then branch again based on whether to treat posterior cross bite, and then again based on other malocclusions that may be treated. In this way, multiple clinically distinct plans are generated based, at least in part, on the measured elements of the patient's malocclusion. For each branch, corrections on the final positions of the patients teeth are determined to treat the corresponding malocclusions.

In step 514, an interim final position for one or more, preferably all, of the treatment plans generated in step 512 is determined. In some embodiments, rather than determining an interim final position at step 514 and elsewhere, for example, at steps 706, 820, 926, and other final positions (FiPos) steps, the system stores the setting for each treatment plan without determining the final position and then determines the final positions for each treatment plan branch generated by the system is run later in the process, for example, at step 532. If an interim final position is determined to be clinically unacceptably, then the treatment plan associated with that particular interim final position may be discarded and may not be acted upon by the system through the rest of the process.

In step 516, the root apex movement is measured between the initial and interim final positions and based on these measurements the process continues to either step 518 or step 519. If the upper and lower buccal protrusion of root apex movement is greater than a threshold, for example, 2 mm, between the initial and interim final positions, then the process branches to step 518, otherwise the process continues direction to step 519, without conducting an bi-protrusion correction. In some embodiments, the threshold may be ¼ mm, ½ mm, ¾ mm, 1 mm, 1.5 mm, 2 mm, 2.5 mm, 3 mm, 3.5 mm, or 4 mm, or between any two of these thresholds.

The thresholds discussed herein may be predetermined, for example, based on doctor preferences, or based on diagnostic evaluation for each patent, such as a cephalometric assessment of CBCT assessment of the patient.

Figure 7:
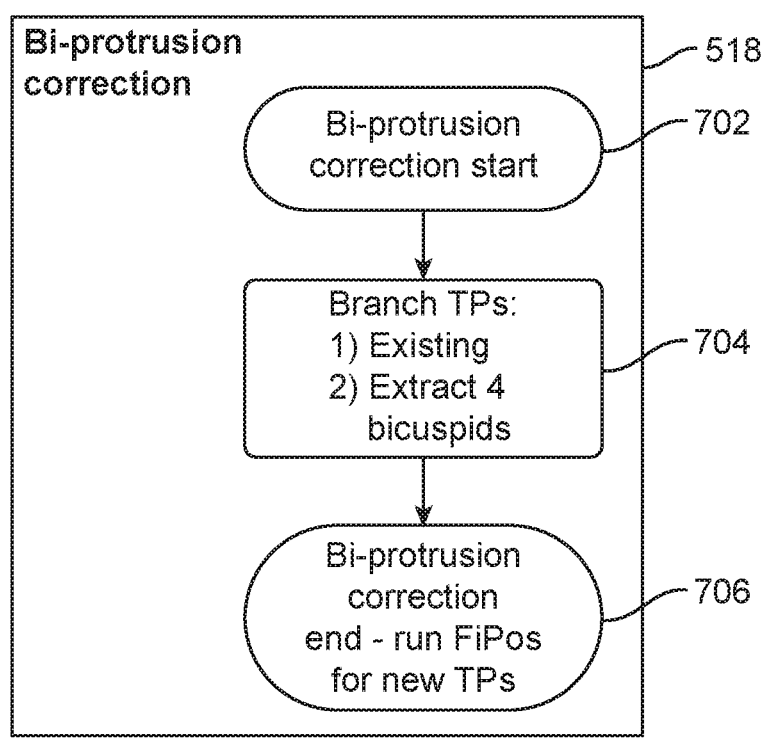
FIG. 7 illustrates a method of correcting bi-protrusion of teeth in a treatment plan, in accordance with one or more embodiments herein.

In step 518, the method of correcting bi-protrusion, an element of a patient's malocclusion, may be carried out, for example, as shown and described with respect to FIG. 7. Upon completion of the correction of the bi-protrusion correction process, the process continues to step 519. The bi-protrusion correction process may result in further branching of the multiple treatment plans generated in step 512 based on, for example, whether any bicuspids are extracted and if so, how many bicuspids are extracted.

In step 519, the process determines whether or not to correct the molar malocclusions, another element of a patient's malocclusion. A dental practitioner may indicate that molar malocclusions should be corrected, or the system may determine that molar malocclusions should be corrected based on the measured positions of the teeth. If no molar correction is selected then the process moves to step 524. If molar correction is selected, then the process moves to step 520.

In step 520, the process determines the molar occlusion class, also referred to as the molar relationship. The molar occlusion class may be determined based on the measured position of the molars, including their orientation. If the system determines that the patient's teeth have a class I molar occlusion, then the process proceeds to step 524. If the system determines that the patient's teeth have a molar class II, molar class III, or mixed molar class II and molar class III malocclusion, then the process proceeds to step 522 for correction of the molar malocclusion.

Figure 8:
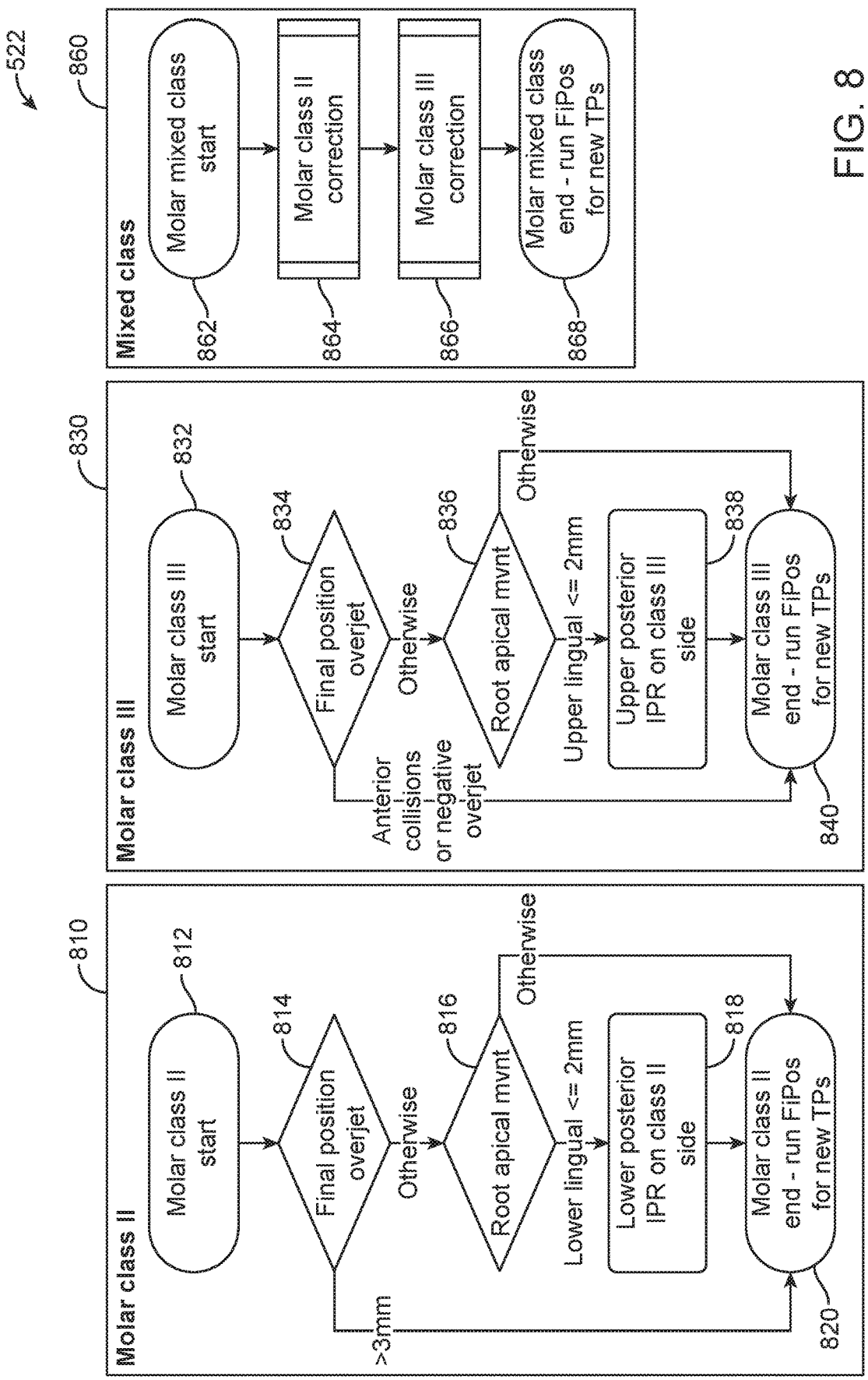
FIG. 8 illustrates methods of correcting molar malocclusions and positions in a treatment plan, in accordance with one or more embodiments herein.

In step 522, the molar relationship is corrected as shown and described with respect to FIG. 8. Upon completion of the correction of the molar relationship, the process continues to step 524.

In step 524, the process determines the canine occlusion class, also referred to as the canine relationship, which is an element of a patient's malocclusion. The canine occlusion class may be determined based on the measured position of one or more of the patient's canines. Position measurement may include orientation. If the system determines that the patient's teeth have a canine class I occlusion, then the process proceeds to step 528. If the system determines that the patient's teeth have a canine class II, canine class III, or mixed canine class II and canine class III malocclusion, then the process proceeds to step 526 for correction of the canine malocclusion.

Figure 9:
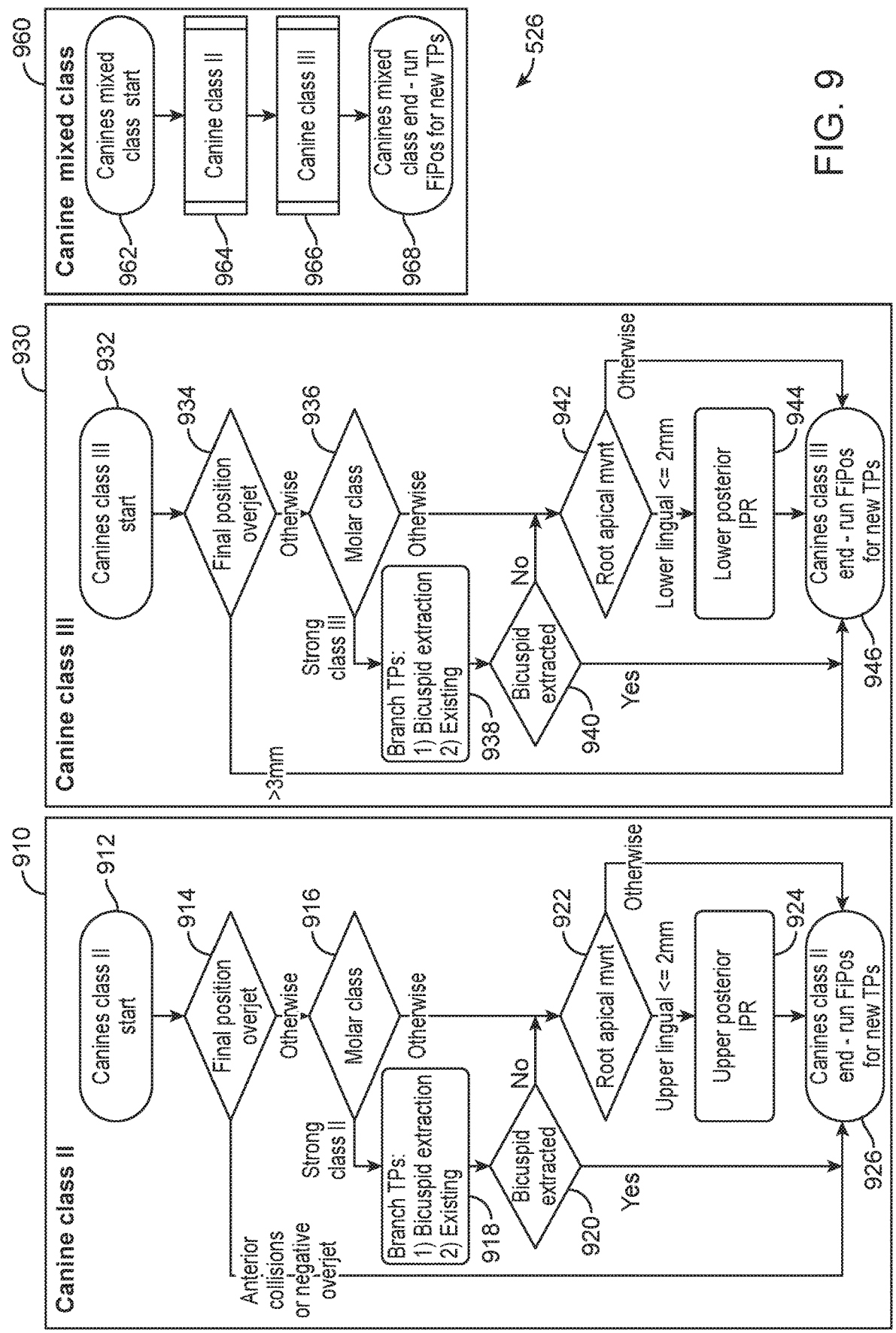
FIG. 9 illustrates methods of correcting canine malocclusions and positions in a treatment plan, in accordance with one or more embodiments herein.

In step 526, the method of correction the canine relationship may be carried out, as shown and described with respect to FIG. 9. Upon completion of the correction of the canine relationship, the process continues to step 528.

In step 528, the amount of over jet, an element of a patient's malocclusion, is determined, for example, by measuring the amount of overj et of the teeth. For example, if the overjet is between two thresholds, such as 0 mm and 3 mm and no collisions between lower and upper anterior teeth are present, then the process continues to step 832, otherwise the process continues to step 530. In some embodiments, the thresholds may be ¼ mm, ½ mm, ¾ mm, 1 mm, 1.5 mm, 2 mm, 2.5 mm, 3 mm, 3.5 mm, or 4 mm, 4.5 mm 5 mm or between any two of these thresholds.

Figure 10:
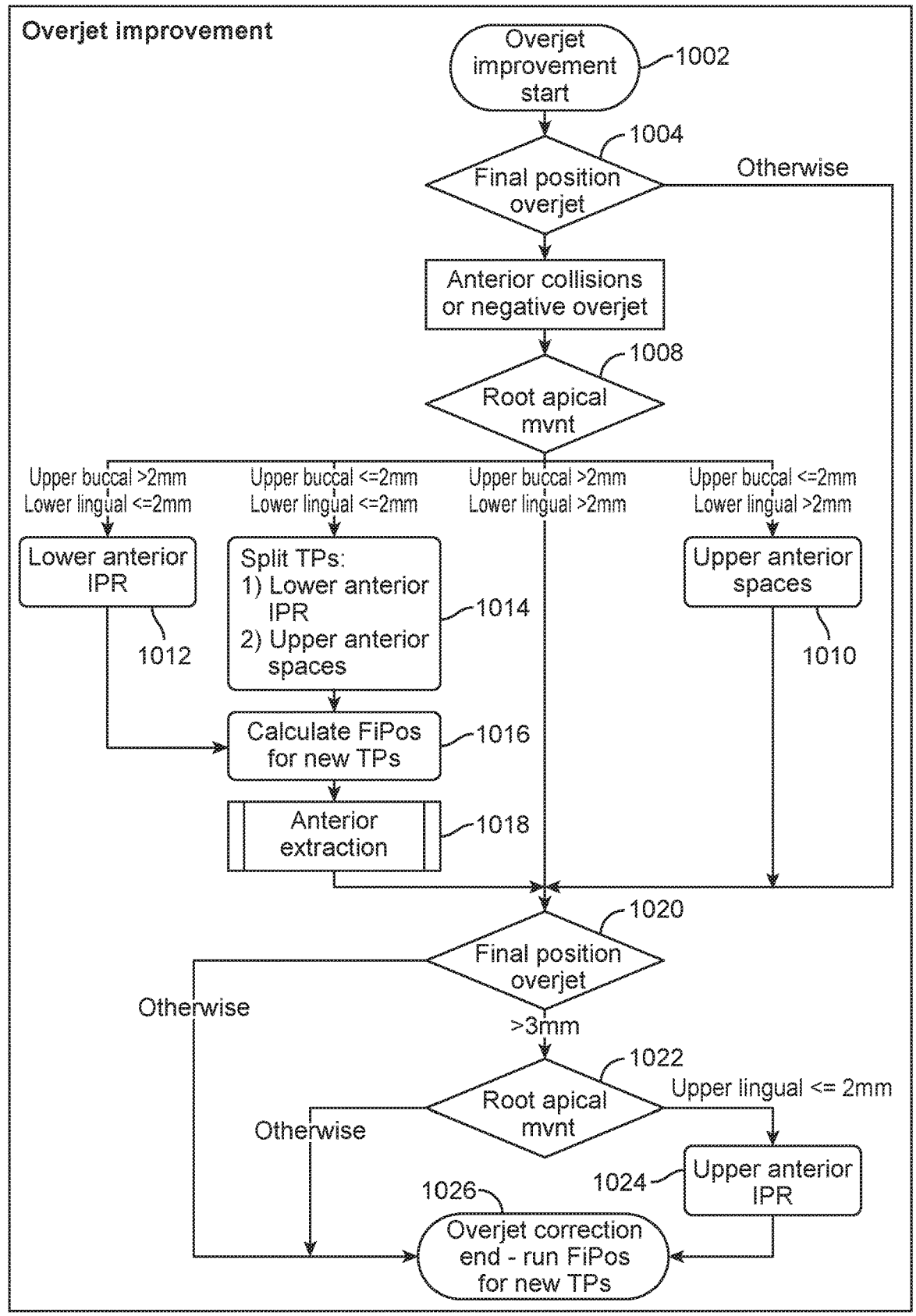
FIG. 10 illustrates methods of correcting overjet of teeth in a treatment plan, in accordance with one or more embodiments herein.

In step 530, the method of overjet correction may be carried out, for example, as shown and described with respect to FIG. 10. Upon completion of the overjet correction, the process continues to step 532.

Figure 12:
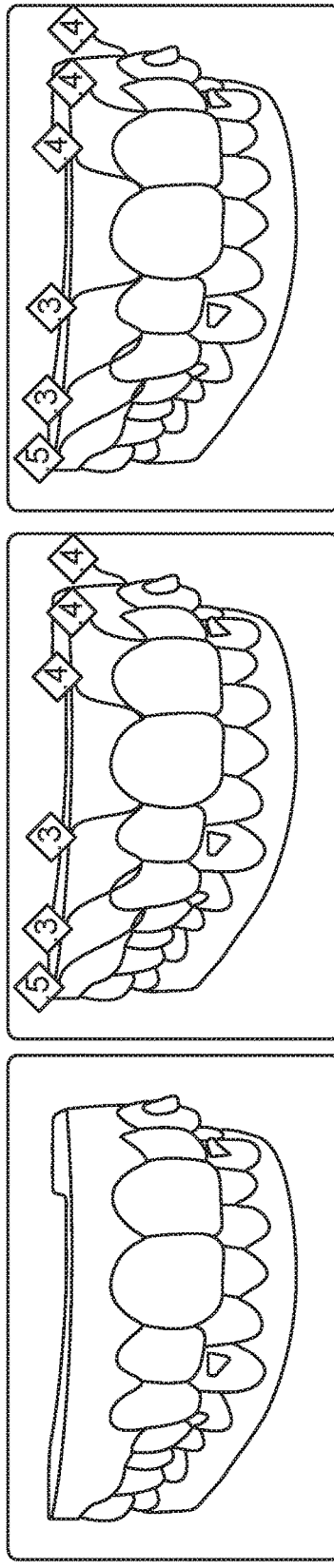
FIG. 12 illustrates the presentation and selected of a treatment plan for patient treatment, in accordance with one or more embodiments herein.
Figure 12:
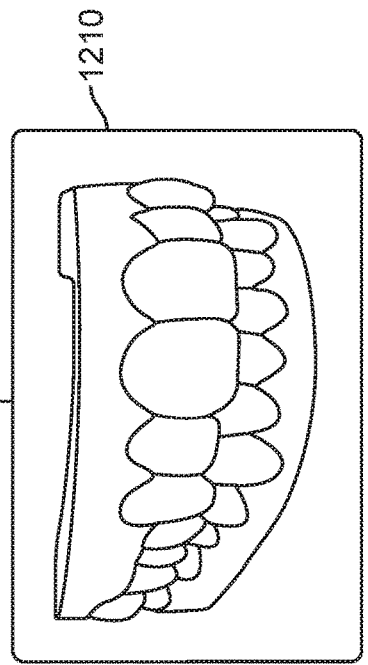

In step 532, the method 500 of determining the final position of the teeth may be completed. Upon completion, the process may continue on to the stage generation and appliance manufacturing steps, for example, upon reaching step 532, the process by continue to step 320, as shown and described with respect to FIG. 3. In some embodiments, at step 532, a dental practitioner is presented with one or more of the treatment plans and the dental practitioner selects one of the treatment plans for patient treatment. For example, FIG. 12 depicts the three treatment plans 1202*a*, 1202*b*, 1202*c* from which a medical professional may select. The treatment plans 1202*a*, 1202*b*, 1202*c*, were developed with the process 500 from the initial scan 1210. The treatment plans may be selected from the various branched treatment plans discussed herein. The treatment plans may be selected based on one or more of the type of treatment included in the treatment plans, such as whether or not one or more teeth are extracted, whether or not and the degree of interproximal reduction is to be preformed, the number of stages for treatment, and other factors. For example, the treatment plan with the least number of stages without respect to type of treatments may be presented along with the treatment plan with the least number of stages that also includes interproximal reduction, and the treatment plan with the least number of stages that includes anterior interproximal reduction of only the anterior teeth.

Figure 6:
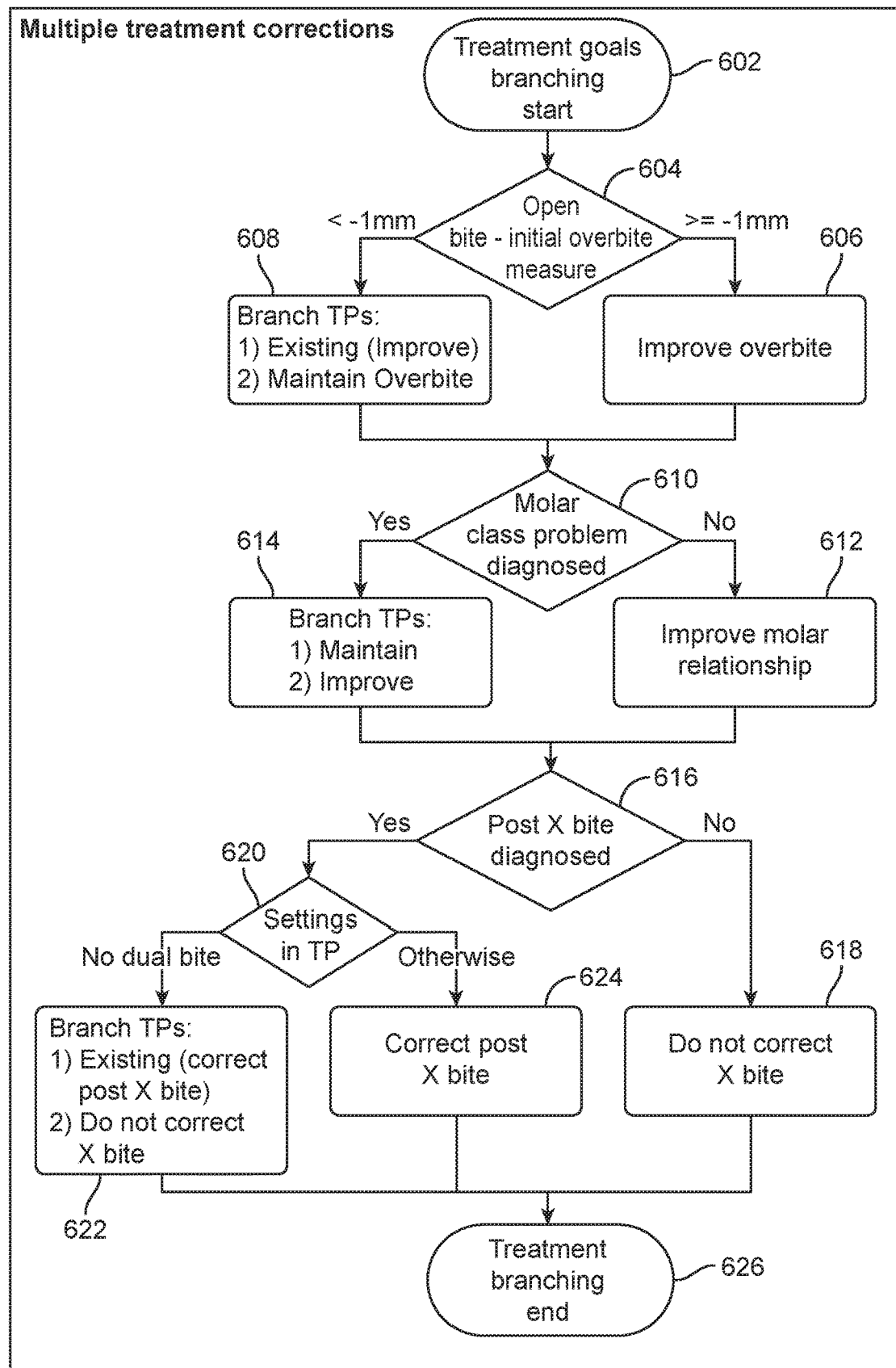
FIG. 6 illustrates a method of generating a plurality of treatment plans, in accordance with one or more embodiments herein.

Referring now to FIG. 6, a method 512 of generating multiple treatment corrections is shown. The degree of malocclusion for multiple elements of a patient's malocclusion are measured and the system determines whether a treatment branch, each of which may include a different treatment plans, is formed. The treatment branches may include branches for correction of openbite, major class problem diagnoses, posterior crossbite, and others may be formed, as shown and described with respect to the steps, below. Each treatment plan branch may branch a second time, third time, and so on. For example, two branches may be formed based on whether to treat an openbite type malocclusion or maintain the openbite. The treat openbite branch and the maintain open bite branch may each then branch again based on whether the molar relationship is maintained or improved. The resulting four branches may then each branch again based on whether to treated posterior cross bite, and then each brans again based on other malocclusions that may be treated. In this way, multiple clinically distinct plans are generated based, at least in part, on the measured elements of the patient's malocclusion. The final positions of the patient's teeth are determined for each generated treatment plan branch in order to treat the corresponding malocclusions.

In step 602, the method 512 of generating multiple treatment corrections is started. Here, the initial measured positions of the teeth, which may include a three-dimensional model of the teeth, are evaluated.

In step 604, the amount of openbite, an element of a patient's malocclusion, may be measured based on a model of the upper and lower arches of the patient's teeth in normal occlusion or a previously measured amount of overbite may be evaluated. If the amount of measured openbite is greater than or equal to a threshold, such as −1 mm, then the process moves to step 606 and no additional treatment plan branch is created for openbite. However, if the openbite is less than the threshold then the process moves to step 608 where two additional treatment plan branches are formed: a branch wherein the openbite is not treated, for example it is maintained, and a branch wherein the openbite is treated, for example, improved such that the amount of overbite is corrected or reduced. In some embodiments, the threshold may be −¼ mm, −½ mm, −¾ mm, −1 mm, −1.5 mm, −2 mm, −2.5 mm, −3 mm, −3.5 mm, or −4 mm, or between any two of these thresholds.

In step 606, the overbite, an element of a patient's malocclusion, is corrected as part of determining the final position of the teeth for each treatment plan branch that is processed by the system in step 606.

In step 608, two branches are created: a branch wherein the openbite is not treated, for example it is maintained, and a branch wherein the openbite is treated, for example, improved such that the amount of overbite is corrected or reduced.

In step 610, the molar positions, including orientations and relationships between molars of opposing arches, an element of a patient's malocclusion, may be measured based on a model of the upper and lower arches of the patient's teeth in normal occlusion or previously measured molar positions may be evaluated for each branched treatment plan. Based on these measurements, molar class problems are diagnosed. If no molar class problems are detected, then the process continues to step 612 and no additional branches are created. However, if a molar class problem is detected, then the process continues to step 614 where two additional treatment plan branches are formed: a branch wherein the major class problem or problems are not treated, for example they are maintained, and a branch wherein the major class problem or problems are treated, for example, improved such that the major class problems are reduced or corrected.

In step 612, the molar relationships are corrected as part of determining the final position of the teeth for each particular treatment plan branch.

In step 614, a branch wherein the major class problems are not treated, for example they are maintained, is created and a branch wherein the major class problems are treated, for example, improved such that the relationships between the molars are corrected or reduced is created.

In step 616, the amount of posterior crossbite may be measured based on a model of the upper and lower arches of the patient's teeth in normal occlusion or a previously measured amount of posterior corssbite may be evaluated. If the amount of measured posterior crossbite is less than a threshold value, or otherwise not diagnosed, then the process moves to step 618 and no additional treatment plan branch is created for posterior crossbite. However, if the posterior crossbite is greater than a threshold value, or otherwise diagnosed, then the process moves to step 620, where two additional treatment plan branches are formed: a branch wherein the openbite is not treated, for example it is maintained, and a branch wherein the posterior crossbite is treated, for example, improved such that the amount of posterior crossbite is corrected or reduced.

In step 618, the posterior crossbite is not corrected as part of determining the final position of the teeth for each particular treatment plan branch that is processed by the system in step 618 and no additional treatment plan branches are created.

In step 620, the posterior crossbite (an element of a patient's malocclusion) settings may be set, received, or read by the system. For example, the system or process may receive instructions to improve or correct posterior dual bite or not to correct posterior dual bite. If improving or correcting dual bite is not selected or indicated the process proceeds to 622 where two additional branches are created for each treatment plan branch: one branch wherein posterior crossbite is corrected or improved, and one branch wherein posterior crossbite is not corrected or improved, otherwise, the process proceeds to 624.

In step 624, two additional branches are created for each treatment plan branch that is evaluated: one branch wherein posterior crossbite is corrected or improved, and one branch wherein posterior crossbite is not corrected or improved.

In step 622, the posterior crossbite is corrected as part of determining the final position of the teeth for each particular treatment plan branches and no additional treatment plan branches are created.

In step 626, the treatment corrections branching ends and the process 500 continues to step 514, shown in FIG. 5A.

Referring now to FIG. 7, the method of correcting bi-protrusion may be carried out, for example, as shown and described with respect to the steps below. The bi-protrusion correction process may result in further branching of the multiple treatment plans generated in step 512 based on, for example, whether any bicuspids are extracted and if so, how many bicuspids are extracted.

In step 702, each of each treatment plan branch is passed to or received by the bi-protraction correction process.

In step 704, each treatment plan branch is further branched into two additional treatment plans: one branched plan wherein the bicuspids remain and one branched plan wherein four bicuspids are extracted. In some embodiments, more or less than four bicuspids may be extracted or additional treatment plans may be generated wherein more or less than four bicuspids are extracted, for example, in some treatment plan branches only one or two upper bicuspids are extracted and in some treatment plan branches only one or two lower bicuspids are extracted. A treatment plan branch may be created for each possible permutation of bicuspid extraction.

In step 706, the bi-protrusion correction process ends and the process 500 continues to step 519, shown in FIGS. 5A and 5B. In some embodiments, an interim final position of the teeth in each treatment plan branch is determined.

Referring now to FIG. 8, a method 522 of correcting the molar relationship may be carried out, for example, as shown and described with respect to the steps below. If a molar class II malocclusion is present, based on the measured positions, including orientations, of the molars, then the method 810 for correcting or reducing molar class II malocclusions may be carried out. If a molar class III malocclusion is present, based on the measured positions, including orientations, of the molars, then the method 830 for correcting or reducing molar class III malocclusions may be carried out. If a mixed molar class II and molar class III malocclusion is present, based on the measured positions, including orientations, of the molars, then the method 860 for correcting or reducing mixed molar class II and molar class III malocclusion may be carried out.

Method 810 for correcting molar class II malocclusions starts at step 812.

In step 812, each treatment plan branch is passed to or received by the system for use in method 810.

In step 814, the molar overjet is measured for each treatment plan branch. For example, the final tooth positions determined in step 706 for each treatment plan branch are used to measure the molar overjet. If the overjet in the final position for a particular treatment plan is greater than a threshold, such as 3 mm, then the process continues to step 820 for that particular treatment plan, otherwise, the process continues to step 816 for that treatment plan. In some embodiments, the threshold may be ¼ mm, ½ mm, ¾ mm, 1 mm, 1.5 mm, 2 mm, 2.5 mm, 3 mm, 3.5 mm, or 4 mm, or between any two of these thresholds.

In step 816, the root apical movement is measured for each treatment plan branch. For example, the final tooth positions determined in step 706 for each treatment plan branch are used to measure the root apical movement. If the root apical movement in the final position for a particular treatment plan is less than or equal to a threshold of, for example, 2 mm lower lingual, then the process continues to step 818 for that particular treatment plan, otherwise, the process continues to step 820 for that treatment plan. In some embodiments, the threshold may be ¼ mm, ½ mm, ¾ mm, 1 mm, 1.5 mm, 2 mm, 2.5 mm, 3 mm, 3.5 mm, or 4 mm, or between any two of these thresholds.

In step 818, lower posterior interproximal reduction on the class II side of the molar or molars is added to the treatment plan. In some embodiments, the amount of interproximal reduction is also determined at this step.

In step 820, the molar class II process ends and the process 500 continues to step 524, shown in FIGS. 5A and 5B. In some embodiments, an interim final position of the teeth in each treatment plan branch is determined.

Method 830 for correcting molar class III malocclusions starts at step 832.

In step 832, each treatment plan branch is passed to or received by the system for use in method 830.

In step 834, the molar overjet is measured for each treatment plan branch. For example, the final tooth positions determined in step 706 for each treatment plan branch are used to measure the molar overjet. If the overjet in the final position for a particular treatment plan show anterior collisions or negative overjet, then the process continues to step 840 for that particular treatment plan, otherwise, the process continues to step 836 for that treatment plan.

In step 836, the root apical movement is measured for each treatment plan branch. For example, the final tooth positions determined in step 706 for each treatment plan branch are used to measure the root apical movement. If the root apical movement in the final position for a particular treatment plan is less than or equal to a threshold of, for example, 2 mm upper lingual, then the process continues to step 838 for that particular treatment plan, otherwise, the process continues to step 840 for that treatment plan. In some embodiments, the threshold may be ¼ mm, ½ mm, ¾ mm, 1 mm, 1.5 mm, 2 mm, 2.5 mm, 3 mm, 3.5 mm, or 4 mm, or between any two of these thresholds.

In step 838, upper posterior interproximal reduction on the class III side of the molar or molars is added to the treatment plan. In some embodiments, the amount of interproximal reduction is also determined at this step.

In step 840, the molar class II process ends and the process 500 continues to step 524, shown in FIGS. 5A and 5B. In some embodiments, an interim final position of the teeth in each treatment plan branch is determined.

Method 860 for correcting mixed molar class II and molar class III malocclusions starts at step 862.

In step 862, each treatment plan branch is passed to or received by the system for use in method 860.

In step 864, the process carries out the method 810 as described herein and then continues to sept 866.

In step 866, the process carries out the method 830 as described herein and then continues to step 868.

In step 868, the molar class process ends and the process 500 continues to step 524, shown in FIGS. 5A and 5B. In some embodiments, an interim final position of the teeth in each treatment plan branch is determined.

Referring now to FIG. 9, the method 526 of correction the canine relationship may be carried out as shown and described with respect to the steps below. If a canine class II malocclusion is present, based on the measured positions, including orientations, of the canine, then the method 910 for correcting or reducing canine class II malocclusions may be carried out. If a canine class III malocclusion is present, based on the measured positions, including orientations, of the canine, then the method 930 for correcting or reducing canine class III malocclusions may be carried out. If a mixed canine class II and canine class III malocclusion is present, based on the measured positions, including orientations, of the canine, then the method 960 for correcting or reducing mixed canine class II and canine class III malocclusion may be carried out.

Method 910 for correcting canine class II malocclusions starts at step 912.

In step 912, each treatment plan branch is passed to or received by the system for use in method 910.

In step 914, the canine overjet is measured for each treatment plan branch. For example, the final tooth positions determined in step 706 or step 522 for each treatment plan branch are used to measure the canine overjet. If the canine overjet in the final position for a particular treatment plan indicates anterior collisions or negative overjet, then the process continues to step 926 for that particular treatment plan, otherwise, the process continues to step 916 for that treatment plan.

In step 916, the molar positions, including orientations, is measured for each treatment plan branch. For example, the final tooth positions determined in step 706 for each treatment plan branch are used to determine the strength of the molar class. If the molar class in the final position for a particular treatment plan is indicated as a severe (sometimes referred to as strong) class II, such as the upper and lower molar cusps being aligned with each other, then the process continues to step 918 for that particular treatment plan, otherwise, the process continues to step 922 for that treatment plan.

In step 918, each treatment plan branch is further branched into two additional treatment plans: one branch wherein the bicuspids remain and one branch wherein four bicuspids are extracted. In some embodiments, more or less than four bicuspids may be extracted or additional treatment plans may be generated wherein more or less than four bicuspids are extracted, for example, in some treatment plan branches only one or two upper bicuspids are extracted and in some treatment plan branches only one or two lower bicuspids are extracted. The process then continues to step 920.

In step 920, each branched treatment plan, whether or not bicuspid extraction has been selected or determined, is evaluated. If bicuspids are to be extracted, then the process continues to step 926. If bicuspids are not to be extracted, then the process continues to step 922.

In step 922, the root apical movement is measured for each treatment plan branch. For example, the final tooth positions determined in step 706 for each treatment plan branch are used to measure the root apical movement. If the root apical movement in the final position for a particular treatment plan is less than or equal to a threshold of, for example, 2 mm for upper teeth in the lingual direction, then the process continues to step 924 for that particular treatment plan, otherwise, the process continues to step 926 for that treatment plan. In some embodiments, the threshold may be ¼ mm, ½ mm, ¾ mm, 1 mm, 1.5 mm, 2 mm, 2.5 mm, 3 mm, 3.5 mm, or 4 mm, or between any two of these thresholds.

In step 924, upper posterior interproximal reduction on the canine is added to the treatment plan. In some embodiments, the amount of interproximal reduction is also determined at this step. The process then proceeds with step 926.

In step 926, the canine class II process ends and the process 500 continues to step 528, shown in FIGS. 5A and 5B. In some embodiments, an interim final position of the teeth in each treatment plan branch is determined.

Method 930 for correcting canine class III malocclusions starts at step 832.

In step 932, each treatment plan branch is passed to or received by the system for use in method 932.

In step 934, the canine overjet is measured for each treatment plan branch. For example, the final tooth positions determined in step 706 for each treatment plan branch are used to measure the canine overjet. If the canine overjet in the final position for a particular treatment plan is greater than a threshold of, for example, 3 mm, then the process continues to step 946 for that particular treatment plan, otherwise, the process continues to step 936 for that treatment plan. In some embodiments, the threshold may be ¼ mm, ½ mm, ¾ mm, 1 mm, 1.5 mm, 2 mm, 2.5 mm, 3 mm, 3.5 mm, or 4 mm, or between any two of these thresholds.

In step 936, the canine positions, including orientations, are measured for each treatment plan branch. For example, the final tooth positions determined in step 706 for each treatment plan branch are used to determine the strength of the molar class. If the molar class in the final position for a particular treatment plan is indicated as a severe (sometimes referred to as strong) class III, then the process continues to step 938 for that particular treatment plan, otherwise, the process continues to step 942 for that treatment plan.

In step 938, each treatment plan branch is further branched into two additional treatment plans: one branched plan wherein the bicuspids remain and one branched plan wherein four bicuspids are extracted. In some embodiments, more or less than four bicuspids may be extracted or additional treatment plans may be generated wherein more or less than four bicuspids are extracted, for example, in some treatment plan branches only one or two upper bicuspids are extracted and in some treatment plan branches only one or two lower bicuspids are extracted. The process then continues to step 940.

In step 940, each branched treatment plan, whether or not bicuspid extraction has been selected or determined, is evaluated. If bicuspids are to be extracted, then the process continues to step 946. If bicuspids are not to be extracted, then the process continues to step 942.

In step 942, the root apical movement is measured for each treatment plan branch. For example, the final tooth positions determined in step 706 for each treatment plan branch are used to measure the root apical movement. If the root apical movement in the final position for a particular treatment plan is less than or equal to a threshold of, for example, 2 mm for the lower teeth in the lingual direction, then the process continues to step 944 for that particular treatment plan, otherwise, the process continues to step 946 for that treatment plan. In some embodiments, the threshold may be ¼ mm, ½ mm, ¾ mm, 1 mm, 1.5 mm, 2 mm, 2.5 mm, 3 mm, 3.5 mm, or 4 mm, or between any two of these thresholds.

In step 944, lower posterior interproximal reduction on the canine is added to the treatment plan. In some embodiments, the amount of interproximal reduction is also determined at this step. The process then proceeds with step 946.

In step 946, the canine class III process ends and the process 500 continues to step 528, shown in FIGS. 5A and 5B. In some embodiments, the final position of the teeth in each treatment plan branch is determined.

Method 960 for correcting mixed canine class II and canine class III malocclusions starts at step 862.

In step 962, each treatment plan branch is passed to or received by the system for use in method 960.

In step 964, the process carries out the method 910 as described herein and then continues to sept 966.

In step 966, the process carries out the method 930 as described herein and then continues to step 968.

In step 968, the mixed canine class process ends and the process 500 continues to step 528, shown in FIGS. 5A and 5B. In some embodiments, an interim final position of the teeth in each treatment plan branch is determined.

Referring now to FIG. 10, the method of correcting the overjet 530 may be carried out, for example, as shown and described with respect to the steps below.

In step 1002, each treatment plan branch is passed to or received by the system for use in method 1018.

In step 1004, overjet is measured for each treatment plan branch. For example, the final tooth positions determined in step 526 for each treatment plan branch are used to measure the molar overjet. If the overjet in the final position for a particular treatment plan show anterior collisions or negative overjet, then the process continues to step 1008 for that particular treatment plan, otherwise, the process continues to step 1020 for that treatment plan.

In step 1008, the root apical position is measured and the distance the root apical is displaced is determined. Based on the displacement, the process selects a path for continuing the process. If the upper buccal displacement is greater than a threshold of 2 mm and the lower lingual displacement is less than or equal to a threshold of 2 mm then the process continues to step 1012. If the upper buccal displacement is less than or equal to a threshold of 2 mm and the lower lingual displacement is less than or equal to a threshold of 2 mm then the process continues to step 1014, where additional treatment plan branches are created. If the upper buccal is less than a threshold of 2 mm displacement and the lower lingual is less than a threshold of 2 mm displacement then the process continues to step 1020. If the upper buccal is less than or equal to a threshold of 2 mm and the lower lingual is greater than a threshold of 2 mm then the process continues to step 1010. In some embodiments, the thresholds may be ¼ mm, ½ mm, ¾ mm, 1 mm, 1.5 mm, 2 mm, 2.5 mm, 3 mm, 3.5 mm, or 4 mm, or between any two of these thresholds.

In step 1010, the treatment plan is modified so that upper anterior spaces are allowed between teeth. After allowing the upper anterior spaces, or indicating in the treatment plan that the upper anterior spaces are allowed when determining the final position of the patient's teeth, the process continues to step 1020.

In step 1012, the lower anterior interproximal reduction is performed as part of the treatment plan. After correcting lower anterior interproximal reduction, or indicating in the treatment plan that the lower anterior spaces are to be corrected when determining the final position of the patient's teeth, the process continues to step 1016.

In step 1014, two additional treatment plan branches are formed from each existing treatment plan: a branch wherein the lower anterior interproximal reduction is performed, and a branch wherein the upper anterior spaces are corrected. After creating the two new branches, the process continues to step 1016.

In step 1016, an interim final position of the teeth in each treatment plan branch is recalculated based on the current treatment plan settings for each branch.

Figure 11:
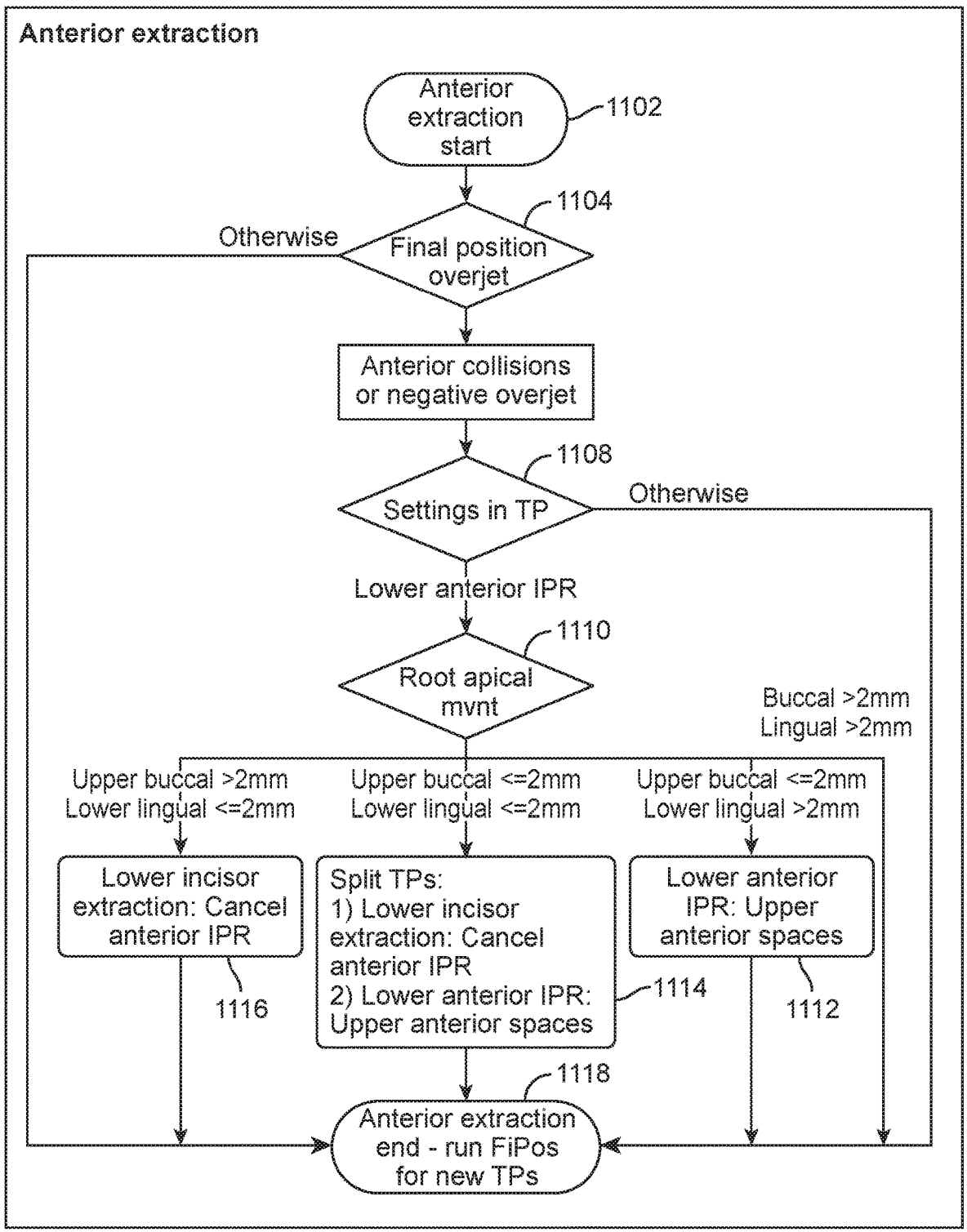
FIG. 11 illustrates methods of extraction of anterior teeth in a treatment plan, in accordance with one or more embodiments herein.

In step 1018, each treatment plan branch that has passed through steps 1012 and 1014 continues to the anterior extraction process 1018 shown in FIG. 11. After the anterior extraction process 1018 is complete, the process continues to step 1020.

In step 1020, the overjet is measured for each treatment plan branch. For example, the final tooth positions determined in step 1118 of the anterior extraction process 1018 or as determined from a preceding final position calculation completed earlier in the process 500, for example as calculated as part of the molar relationship correction process 522, the canine relationship correction process 526, or elsewhere for each treatment plan branch are used to measure the overjet. If the overjet in the final position for a particular treatment plan is greater than a threshold of 3 mm, then the process continues to step 1022 for that particular treatment plan, otherwise, the process continues to step 1026 for that treatment plan. In some embodiments, the threshold may be ¼ mm, ½ mm, ¾ mm, 1 mm, 1.5 mm, 2 mm, 2.5 mm, 3 mm, 3.5 mm, or 4 mm, or between any two of these thresholds.

In step 1022, the root apical position is measured for the patient's teeth and the distance the root apical is displaced is determined based on the final position determined in step 1020. Based on the displacement, the process selects a path for continuing the process. If the upper lingual root apical position has a deviation greater than or equal to a threshold of 2 mm, then the process continues to step 1024, otherwise, the process continues to step 1026. In some embodiments, the threshold may be ¼ mm, ½ mm, ¾ mm, 1 mm, 1.5 mm, 2 mm, 2.5 mm, 3 mm, 3.5 mm, or 4 mm, or between any two of these thresholds.

In step 1024, upper anterior interproximal reduction added as part of the treatment plan. After including upper anterior interproximal reduction, or indicating in the treatment plan that the upper anterior spaces are to be corrected when determining the final position of the patient's teeth, the process continues to step 1026.

In step 1026, the overjet improvement process ends and the process 500 continues to step 532, shown in FIGS. 5A and 5B. In some embodiments, an interim final position of the teeth in each treatment plan branch is determined.

Referring now to FIG. 11, the method of anterior extraction may be carried out, for example, as shown and described with respect to the steps below.

In step 1102, each treatment plan branch is passed to or received by the system for use in method 1018.

In step 1104, overjet is measured for each treatment plan branch. For example, the final tooth positions determined in step 1016 for each treatment plan branch are used to measure the molar overjet. If the overjet in the final position for a particular treatment plan is negative or anterior collisions are present, then the process continues to step 1108 for that particular treatment plan, otherwise, the process continues to step 1118 for that treatment plan.

In step 1108, the anterior extraction settings may be set, received, or read by the system. For example, the system or process may receive instructions to include lower anterior interproximal reduction in the treatment plan. If lower anterior interproximal reduction is selected or indicated then the process moves to step 1110 otherwise, the process continues to step 1118.

In step 1110, the root apical position is measured and the distance the root apical is displaced is determined. Based on the displacement, the process selects a path for continuing the process. If the upper buccal displacement is greater than a threshold of 2 mm and the lower lingual displacement is less than or equal to a threshold of 2 mm then the process continues to step 1116. If the upper buccal displacement is less than or equal to a threshold of 2 mm and the lower lingual displacement is less than or equal to a threshold of 2 mm then the process continues to step 1114, where additional treatment plan branches are created. If the upper buccal displacement is less than or equal to a threshold of 2 mm and the lower lingual displacement is greater than a threshold of 2 mm then the process continues to step 1112.

If the buccal displacement is greater than a threshold of 2 mm and the lingual displacement is greater than a threshold of 2 mm then the process continues to step 1118. In some embodiments, the thresholds may be ¼ mm, ½ mm, ¾ mm, 1 mm, 1.5 mm, 2 mm, 2.5 mm, 3 mm, 3.5 mm, or 4 mm, or between any two of these thresholds.

In step 1112, lower anterior interproximal reduction and the correction of upper anterior spaces are added to the treatment plan and then the process continues to step 1118.

In step 1114, two additional treatment plan branches are formed: a branch wherein lower incisor extraction is added to the treatment plan and any previous anterior interproximal reduction is removed from the treatment plan, and a branch wherein the lower anterior interproximal reduction is preformed and the upper anterior spaces are corrected. After creating the two new branches, the process continues to step 1118.

In step 1116, lower incisor extraction is added to the treatment plan and anterior interproximal reduction is removed from the treatment plan.

In step 1118, the anterior extraction process ends and the process 500 continues to step 1020, shown in FIG. 10. In some embodiments, an interim final position of the teeth in each treatment plan branch is determined.

What is claimed is:

1. A method comprising:
   receiving a three-dimensional model representative of a patient's teeth;
   measuring, based on the three-dimensional model, positions of the patient's teeth;
   receiving tooth movement constraints;
   measuring, based on the three-dimensional model, a first element of a patient's malocclusion of the patient's teeth for one or more types of dental malocclusions;
   using the three-dimensional model and the tooth movement constraints to generate a plurality of treatment plans, wherein each of the plurality of treatment plans comprises a plurality of stages to sequentially reposition the patient's teeth through a plurality of tooth positions, including a first interim final position, and wherein each of the plurality of treatment plans comprises a plurality of appliances each corresponding to one of the plurality of stages;
   measuring a second element of the patient's malocclusion in the first interim final position;
   modifying the first interim final position for each of the plurality of treatment plans to correct the element of the patient's malocclusion and generate a final position for each of the plurality of treatment plans;
   selecting a treatment plan from the plurality of treatment plans; and
   outputting instructions for fabricating the plurality of appliances for the selected treatment plan.

2. The method of claim 1, further comprising:
   fabricating the appliances for one or more stages of the plurality of stages of the selected treatment plan, from the instructions for fabricating the respective appliance.

3. The method of claim 1, further comprising:
   generating, for each treatment plan, two new treatment plans: a first new treatment plan wherein bicuspids are extracted and a second new treatment plan wherein bicuspids are not extracted; and
   determining second interim final tooth positions for each of the first and second new treatment plans of each of the plurality of treatment plans.

4. The method of claim 3, further comprising:
   measuring the positions of the molars in each of the first and second new treatment plans of each of the plurality of treatment plans for determining a molar class occlusion for each treatment plan.

5. The method of claim 4, wherein, for each treatment plan, if a molar class II, class III, or mixed class II and III malocclusion is present in the second interim final tooth positions, then the method further comprises:
   correcting or improving the molar malocclusion; and
   generating third interim final tooth positions for each of the first and second new treatment plans of each of the plurality of treatment plans.

6. The method of claim 3, further comprising:
   measuring the positions of the canines in each of the first and second new treatment plans of each of the plurality of treatment plans for determining a canine class occlusion for each treatment plan.

7. The method of claim 6, wherein, for each treatment plan, if a canine class II, class III, or mixed class II and III malocclusion is present in the second interim final tooth positions, then the method further comprises:
   correcting or improving the canine malocclusion; and
   generating third interim final tooth positions for each of the first and second new treatment plans of each of the plurality of treatment plans.

8. The method of claim 7, wherein, for each treatment plan, the method further comprises:
   generating a third new treatment plan and a fourth new treatment plan based on the presence and strength of the class II or class III canine occlusion, the third new treatment plan including bicuspid extraction and the fourth new treatment plan not including bicuspid extraction.

9. The method of claim 3, further comprising:
   measuring the positions of the teeth in each of the first and second new treatment plans of each of the plurality of treatment plans based on the second interim final tooth positions for each treatment plan for determining an amount of overjet for each treatment plan.

10. The method of claim 9, wherein, for each treatment plan, the method further comprises:
    generating a third new treatment plan and a fourth new treatment plan based on the amount of upper buccal and lower lingual overjet, the third new treatment plan including lower anterior interproximal reduction and the fourth new treatment plan including correction of upper anterior spaces.

11. The method of claim 10, wherein, for each treatment plan, the method further comprises determining third interim final tooth positions.

12. A system for manufacturing an orthodontic appliance, the system comprising:
    a processor; and
    memory including instructions that when executed by the processor cause the system to:
    receive a three-dimensional model representative of a patient's teeth;
    measure, based on the three-dimensional model, positions of the patient's teeth;
    receive tooth movement constraints;
    measure, based on the three-dimensional model, a first element of a patient's malocclusion of the patient's teeth for one or more types of dental malocclusions;
    use the three-dimensional model and the tooth movement constraints to generate a plurality of treatment plans, wherein each of the plurality of treatment plans comprises a plurality of stages to sequentially reposition the patient's teeth through a plurality of tooth positions, including a first interim final position, and wherein each of the plurality of treatment plans comprises a plurality of appliances each corresponding to one of the plurality of stages;

measure a second element of the patient's malocclusion in the first interim final position;

modify the first interim final position for each of the plurality of treatment plans to correct the element of the patient's malocclusion and generate a final position for each of the plurality of treatment plans;

select a treatment plan from the plurality of treatment plans; and output instructions for fabricating the plurality of appliances for the selected treatment plan.

13. The system of claim 12, wherein the instructions further cause the system to:

fabricate the appliances for one or more stages of the plurality of stages of the selected treatment plan, from the instructions for fabricating the respective appliance.

14. The system of claim 12, wherein the instructions further cause the system to:

generate, for each treatment plan, two new treatment plans: a first new treatment plan wherein bicuspids are extracted and a second new treatment plan wherein bicuspids are not extracted; and determine second interim final tooth positions for each of the first and second new treatment plans of each of the plurality of treatment plans.

15. The system of claim 14, wherein the instructions further cause the system to:

measure the positions of the molars in each of the first and second new treatment plans of each of the plurality of treatment plans for determining the molar class occlusion for each treatment plan.

16. The system of claim 15, wherein, for each treatment plan, if a molar class II, class III, or mixed class II and III malocclusion is present in the second interim final tooth positions, the instructions further cause the system to:

correct or improve the molar malocclusion; and generate third interim final tooth positions for each of the first and second new treatment plans of each of the plurality of treatment plans.

17. The system of claim 14, wherein the instructions further cause the system to:

measure the positions of the canines in each of the first and second new treatment plans of each of the plurality of treatment plans for determining the canine class occlusion for each treatment plan.

18. The system of claim 17, wherein, for each treatment plan, if a canine class II, class III, or mixed class II and III malocclusion is present in the second interim final tooth position, the instructions further cause the system to:

correct or improve the canine malocclusion; and generate third interim final tooth positions for each of the first and second new treatment plans of each of the plurality of treatment plans.

19. The system of claim 18, wherein, for each treatment plan the instructions further case the system to:

generate a third new treatment plan and a fourth new treatment plan based on the presence and strength of the class II or class III canine occlusion, the third new treatment plan including bicuspid extraction and the fourth new treatment plan not including bicuspid extraction.

20. The system of claim 14, wherein the instructions further cause the system to:

measure the positions of the teeth in each of the first and second new treatment plans of each of the plurality of treatment plans based on the second interim final tooth positions for each treatment plan for determining an amount of overjet for each treatment plan.

21. The system of claim 20, wherein, for each treatment plan, the instructions further cause the system to:

generate a third new treatment plan and a fourth new treatment plan based on the amount of upper buccal and lower lingual overjet, the third new treatment plan including lower anterior interproximal reduction and the fourth new treatment plan including correction of upper anterior spaces.

22. The system of claim 21, wherein, for each treatment plan, the instructions further cause the system to determine third interim final tooth positions.

* * * * *